(12) United States Patent
Wittenbrock

(10) Patent No.: US 11,957,946 B2
(45) Date of Patent: Apr. 16, 2024

(54) APPARATUS FOR FITNESS TRAINING

(71) Applicant: KLW Fitness Products, LLC, Brunswick, GA (US)

(72) Inventor: Todd Wittenbrock, Chino Hills, CA (US)

(73) Assignee: KLW Fitness Products, LLC, St. Simons Island, GA (US)

( * ) Notice: Subject to any disclaimer, the term of this patent is extended or adjusted under 35 U.S.C. 154(b) by 28 days.

(21) Appl. No.: 17/517,652

(22) Filed: Nov. 2, 2021

(65) Prior Publication Data

US 2022/0134161 A1 May 5, 2022

Related U.S. Application Data

(60) Provisional application No. 63/109,062, filed on Nov. 3, 2020.

(51) Int. Cl.
| | |
|---|---|
| *A63B 21/00* | (2006.01) |
| *A63B 21/055* | (2006.01) |
| *A63B 21/16* | (2006.01) |
| *F16B 47/00* | (2006.01) |

(52) U.S. Cl.
CPC .... *A63B 21/00047* (2013.01); *A63B 21/0552* (2013.01); *A63B 21/0557* (2013.01); *A63B 21/16* (2013.01); *F16B 47/00* (2013.01); *A63B 21/1645* (2013.01)

(58) Field of Classification Search
CPC .......... A63B 21/00047; A63B 21/0552; A63B 21/0557; A63B 21/16; A63B 21/1645; A63B 21/4035; A63B 21/0442; A63B 21/00065; A63B 21/0089; A63B 71/0036; A63B 2225/055; A63B 2225/05; F16B 47/00–006; A47G 1/17
USPC ............ 248/683, 205.5, 205.7, 205.8, 205.9, 248/206.2, 363
See application file for complete search history.

(56) References Cited

U.S. PATENT DOCUMENTS

| | | | | | |
|---|---|---|---|---|---|
| 2,886,277 | A | * | 5/1959 | Boham | ...................... E06C 7/48 248/205.5 |
| 2,918,282 | A | * | 12/1959 | Waterval | ................ A63B 21/06 383/906 |
| 2,940,713 | A | * | 6/1960 | Van Dusen | ............. F16B 47/00 248/205.8 |

(Continued)

OTHER PUBLICATIONS

Abdominal exercise adjustable assistant equipment suction cup home fitness workout https://shopee.sg/3-Colors-Sit-Ups-Abdominal-Exercise-Adjustable-Assistant-Equipment-Suction-Cup-Home-Fitness-Workout-i.116630439.5728053366.

(Continued)

*Primary Examiner* — Gary D Urbiel Goldner
*Assistant Examiner* — Kathleen M Fisk
(74) *Attorney, Agent, or Firm* — Kohrman Jackson & Krantz

(57) ABSTRACT

The present invention discloses an apparatus for fitness training that has an anchoring mechanism for detachably securing the apparatus to a flat surface, an adapter plate connected to the anchoring mechanism, and an anchoring plate connected to the anchoring mechanism using the adapter plate. The adapter plate includes a cutout configured to receive a generally commensurately configured protrusion of a back side of the anchoring plate.

21 Claims, 28 Drawing Sheets

(56) References Cited

U.S. PATENT DOCUMENTS

| | | | | |
|---|---|---|---|---|
| 5,104,077 | A * | 4/1992 | Liu | A47K 5/00 |
| | | | | 248/205.8 |
| 5,385,525 | A * | 1/1995 | Davis | A63B 21/0552 |
| | | | | 482/121 |
| 5,554,091 | A * | 9/1996 | Patey | A63B 21/4011 |
| | | | | 482/121 |
| 6,406,407 | B1 * | 6/2002 | Wiedmann | A63B 5/20 |
| | | | | 482/81 |
| 7,753,831 | B2 * | 7/2010 | Langer | A63B 25/10 |
| | | | | 482/146 |
| 8,157,713 | B1 | 4/2012 | Siskowic et al. | |
| 9,611,884 | B1 * | 4/2017 | Kuo | F16B 47/00 |
| 9,750,358 | B2 * | 9/2017 | Jagger | A47G 19/10 |
| 10,723,276 | B2 * | 7/2020 | Casagrande | B62H 3/00 |
| 11,247,095 | B2 * | 2/2022 | Casagrande | F16B 5/0692 |
| 11,585,371 | B2 * | 2/2023 | Huang | F16M 13/022 |
| 2009/0121102 | A1 * | 5/2009 | Woo | G09F 7/12 |
| | | | | 248/205.7 |
| 2010/0252700 | A1 * | 10/2010 | Wang | F16M 11/10 |
| | | | | 248/206.2 |
| 2012/0112023 | A1 * | 5/2012 | Tollman | F16B 47/006 |
| | | | | 248/205.8 |
| 2012/0292467 | A1 * | 11/2012 | Chen | A45D 27/225 |
| | | | | 248/206.2 |
| 2016/0025264 | A1 * | 1/2016 | Casagrande | F16M 13/00 |
| | | | | 248/205.9 |
| 2018/0272185 | A1 | 9/2018 | Barber | |
| 2019/0307639 | A1 | 10/2019 | Kiernan | |
| 2020/0155890 | A1 * | 5/2020 | Casagrande | A63B 21/0557 |
| 2020/0339377 | A1 * | 10/2020 | Ding | B25H 1/0028 |

OTHER PUBLICATIONS

RZiioo Sit Up Bar, 4 Suction Cups 6 Gear Adjustable Portable Sit-Ups Assistant Device Self-Suction Sit Up Muscle Training Body Stretching Equipment https://www.amazon.co.uk/RZiioo-Adjustable-Assistant-Self-Suction-Stretching/dp/B087JGFJ6B.

* cited by examiner

APPARATUS FOR FITNESS TRAINING

CROSS-REFERENCE TO RELATED APPLICATIONS

This Application claims the benefit of priority of U.S. Utility Provisional Patent Application 63/109,062 filed Nov. 3, 2020, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to an apparatus for fitness training and, more particularly, to a portable suction cup-based fitness training apparatus with compact form-factor.

Description of Related Art

Conventional suction cup-based exercise devices are well known and have been in use for a number of years. Regrettably, most conventional suction cup-based exercise devices are configured to be secured onto a horizontal surface such as a floor, which limits the type of exercises that may be performed, limiting the overall fitness training.

Additionally, most conventional suction cup-based exercise devices have a low negative fluid pressure strength, resulting in a limited, low load-bearing weight capacity (e.g., 100 lbs.). That is, the amount of force (or load) required to detach the conventional suction cup by simply pulling it is low. Regrettably, the low load-bearing weight capacity or force of most conventional suction cup-based exercise devices (of about 100 lbs.) make them insufficient for proper training and fitness.

Resistance bands exist that use door anchors that may be used to connect a resistance band to a door/frame and hence, the anchoring of resistance bands need not be a suction cup anchored to a horizontal surface such as the floor. However, this limits the anchoring of the bands to door/frames only and also, must be taken off to enable for the operation of the door (to open or to close the door). For example, even during exercise if another individual wishes to open the door, the exercise must be stopped. Accordingly, such devices must be removed after exercise to enable proper operation of a door.

The use of doors/frames as anchoring points limits the maximum amount of resistance or weight that may be used for exercise so to not damage the structural integrity of the door. Door/frame may be damage due to concentration of all pull forces at the anchor point of the door/frame. Regrettably, this low load-bearing weight capacity make conventional resistance bands using door anchors insufficient for proper training and fitness.

Accordingly, in light of the current state of the art and the drawbacks to current exercise devices mentioned above, a need exists for an apparatus for fitness training that would be portable with compact form-factor, anchor to a flat surface (floor, walls, doors, etc.), and have a large load-bearing weight capacity (force).

BRIEF SUMMARY OF THE INVENTION

A non-limiting, exemplary aspect of an embodiment of the present invention provides an apparatus for fitness training, comprising:
- an anchoring mechanism for detachably securing the apparatus to a flat surface of a structure;
- an adapter plate connected to the anchoring mechanism; and
- an anchoring plate connected to the anchoring mechanism using the adapter plate.

A non-limiting, exemplary aspect of an embodiment of the present invention provides an apparatus for fitness training, comprising:
- an anchoring mechanism for detachably securing the apparatus to a flat surface; and
- an anchoring plate associated with the anchoring mechanism.

A non-limiting, exemplary aspect of an embodiment of the present invention provides an apparatus for fitness training, comprising:
- an anchoring mechanism for detachably securing the apparatus to a flat surface; and
- an anchoring plate associated with the anchoring mechanism, with one or more fitness training devices detachably connected to the anchoring plate.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

Figure 1A:
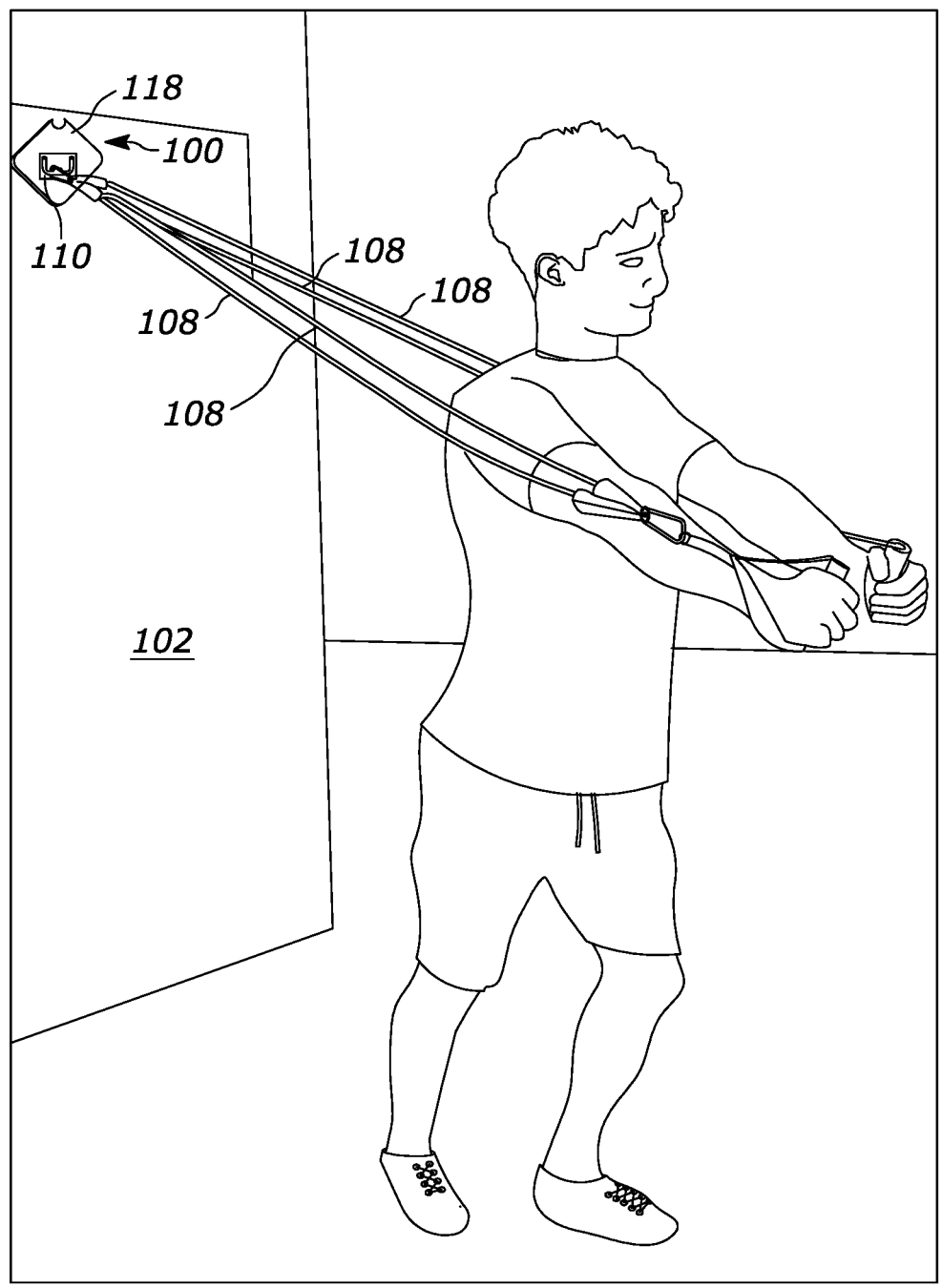
FIGS. 1A to 1E are non-limiting, exemplary illustrations of various methods for using an apparatus for fitness training in accordance with one or more embodiments of the present invention.
Figure 1B:
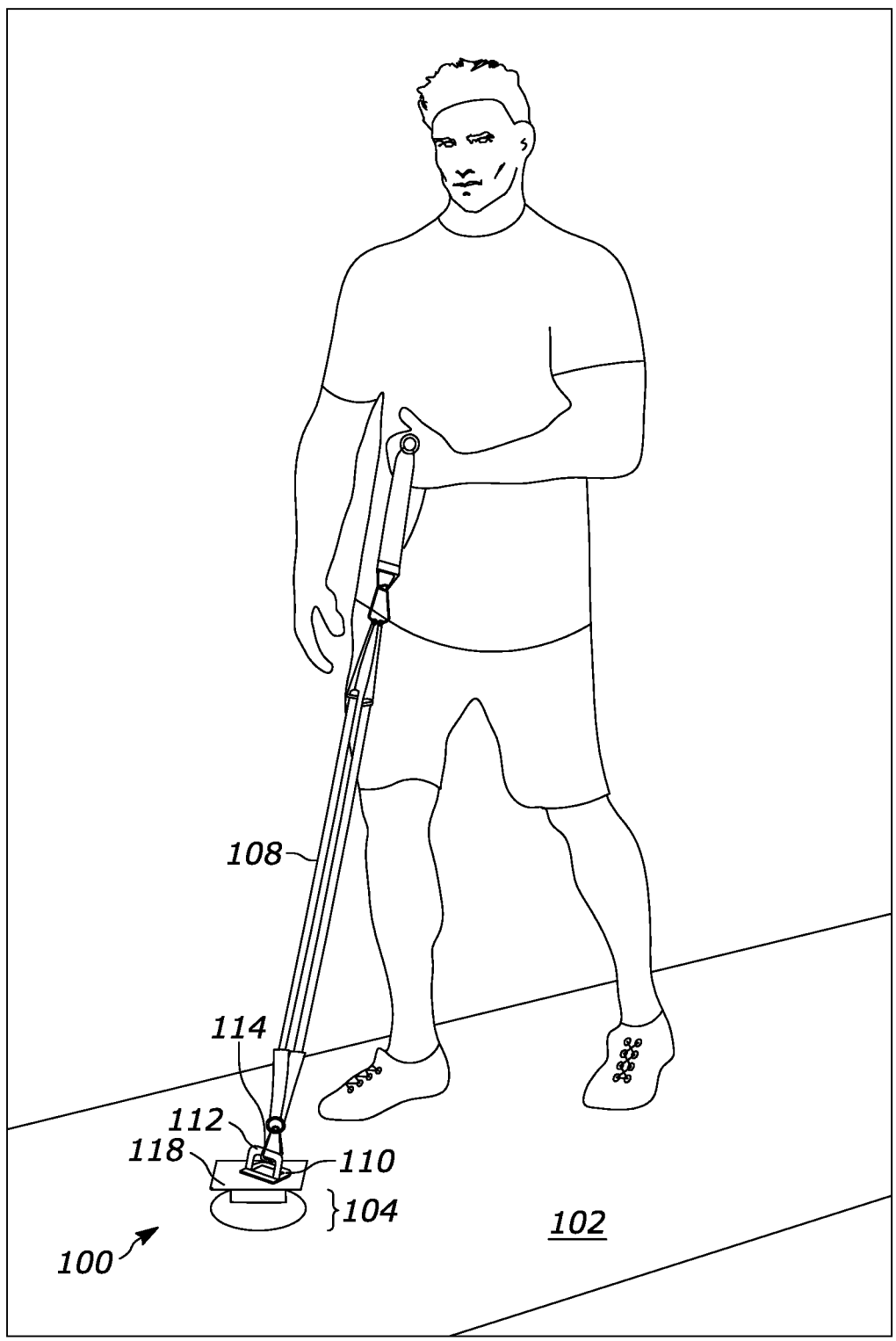
Figure 1C:
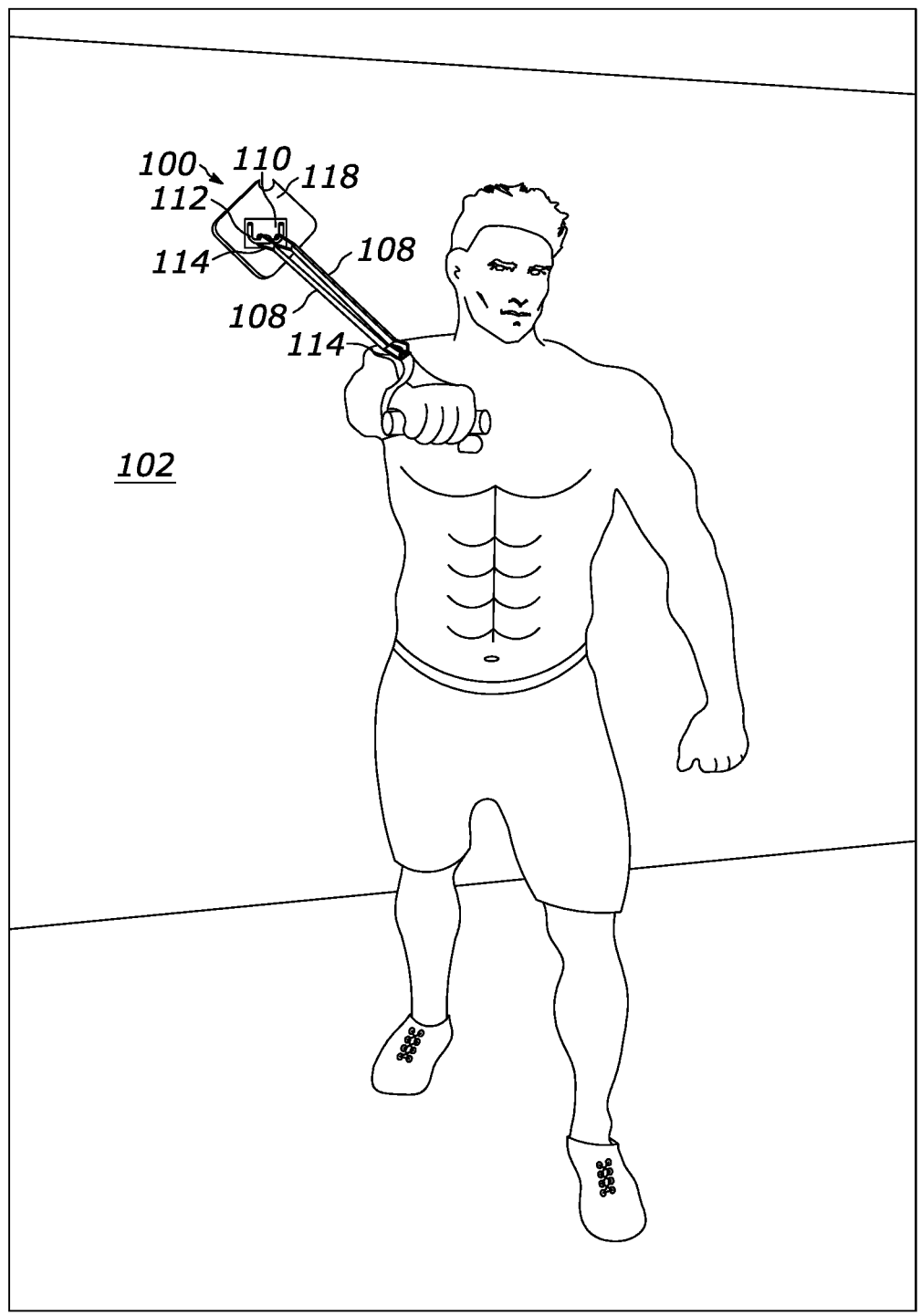
Figure 1D:
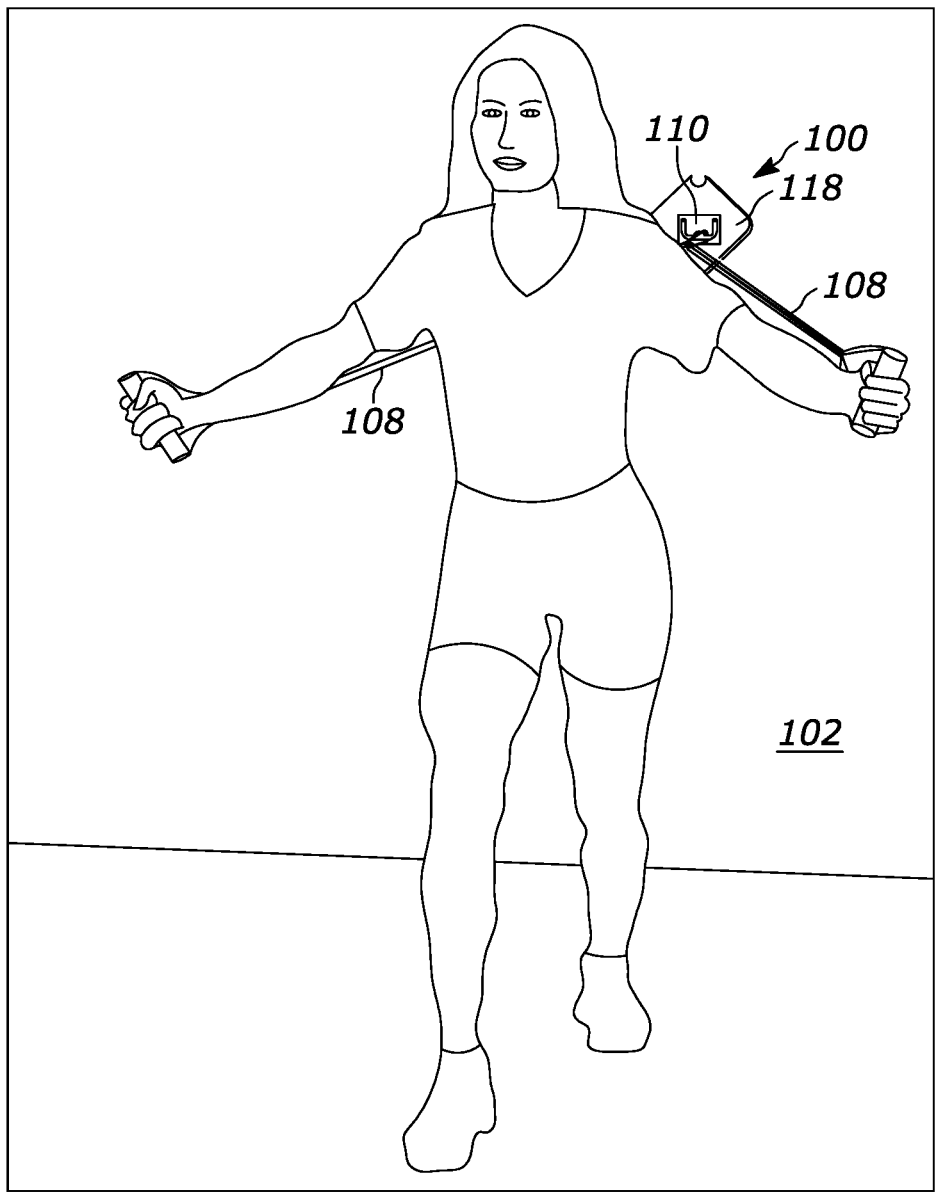
Figure 1E:
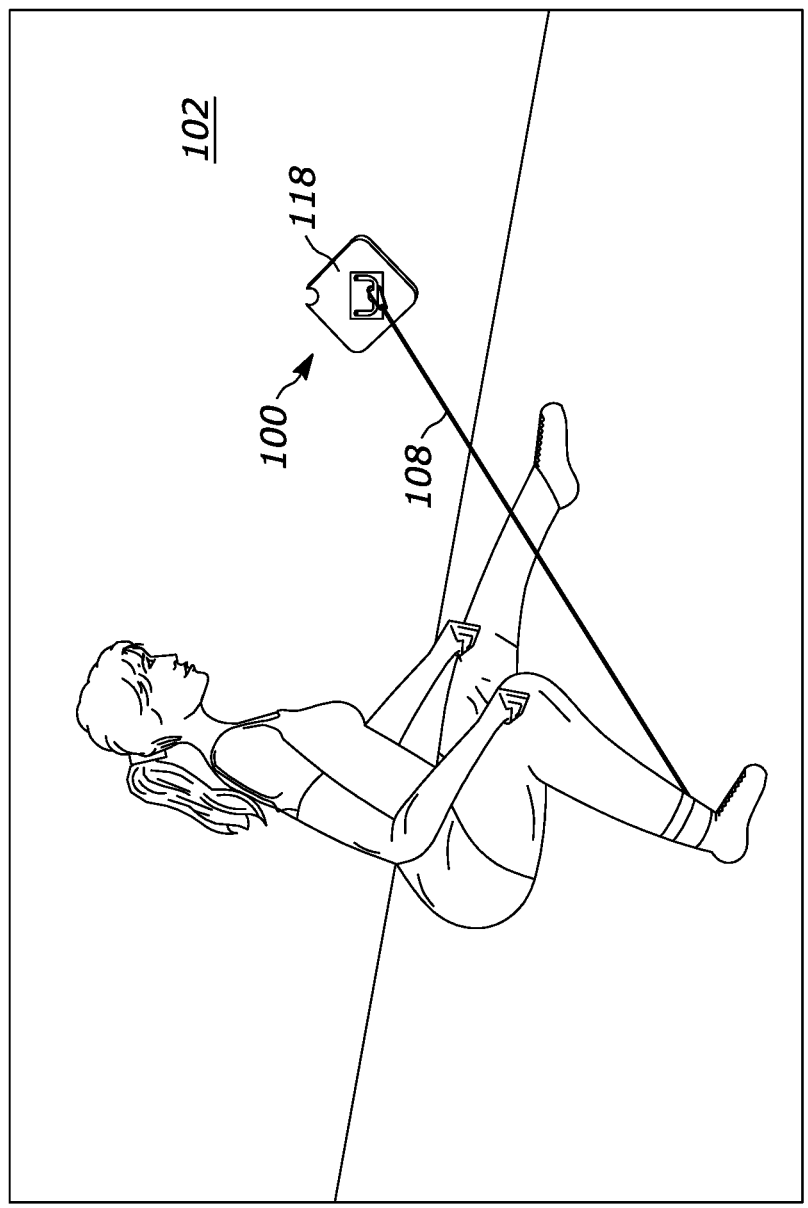

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention may use the phrase form factor as the physical size and or shape of various members of the one or more embodiments of the fitness training apparatus of the present invention.

One or more embodiments of the present invention provide an apparatus for fitness training that is portable with a compact form-factor that detachably anchors to a flat surface (floor, walls, doors, etc.), and has a large load-bearing weight capacity (or force), a non-limiting example of which may be 240 lbs.

FIGS. 1A to 1E are non-limiting, exemplary illustrations of various methods for using an apparatus for fitness training in accordance with one or more embodiments of the present invention. As illustrated, fitness training apparatus 100 may be used for a variety of both upper and lower body intense training exercises, non-limiting, non-exhaustive examples of which are illustrated in FIGS. 1A to 1E.

As further detailed below, fitness training apparatus 100 may be detachably secured to any nonporous surface 102 using an anchoring mechanism 104 of fitness training apparatus 100. One or more fitness training devices 108 may be connected to an anchoring plate 110 of fitness training apparatus 100 for training as shown in FIGS. 1A to 1E.

Figure 2A:
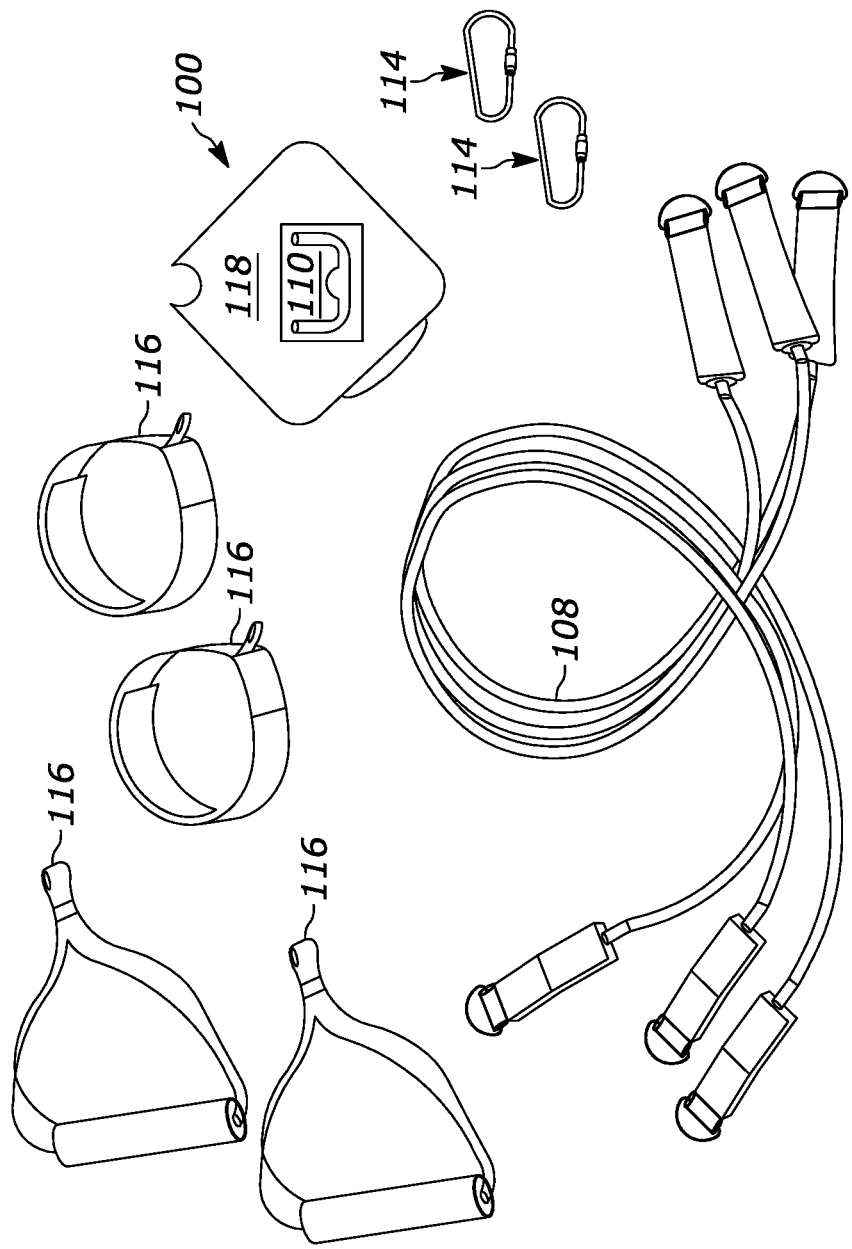
FIGS. 2A to 2D are non-limiting, exemplary illustrations of the apparatus for fitness training shown in FIGS. 1A to 1E in a kit-format in accordance with one or more embodiments of the present invention.
Figure 2B:
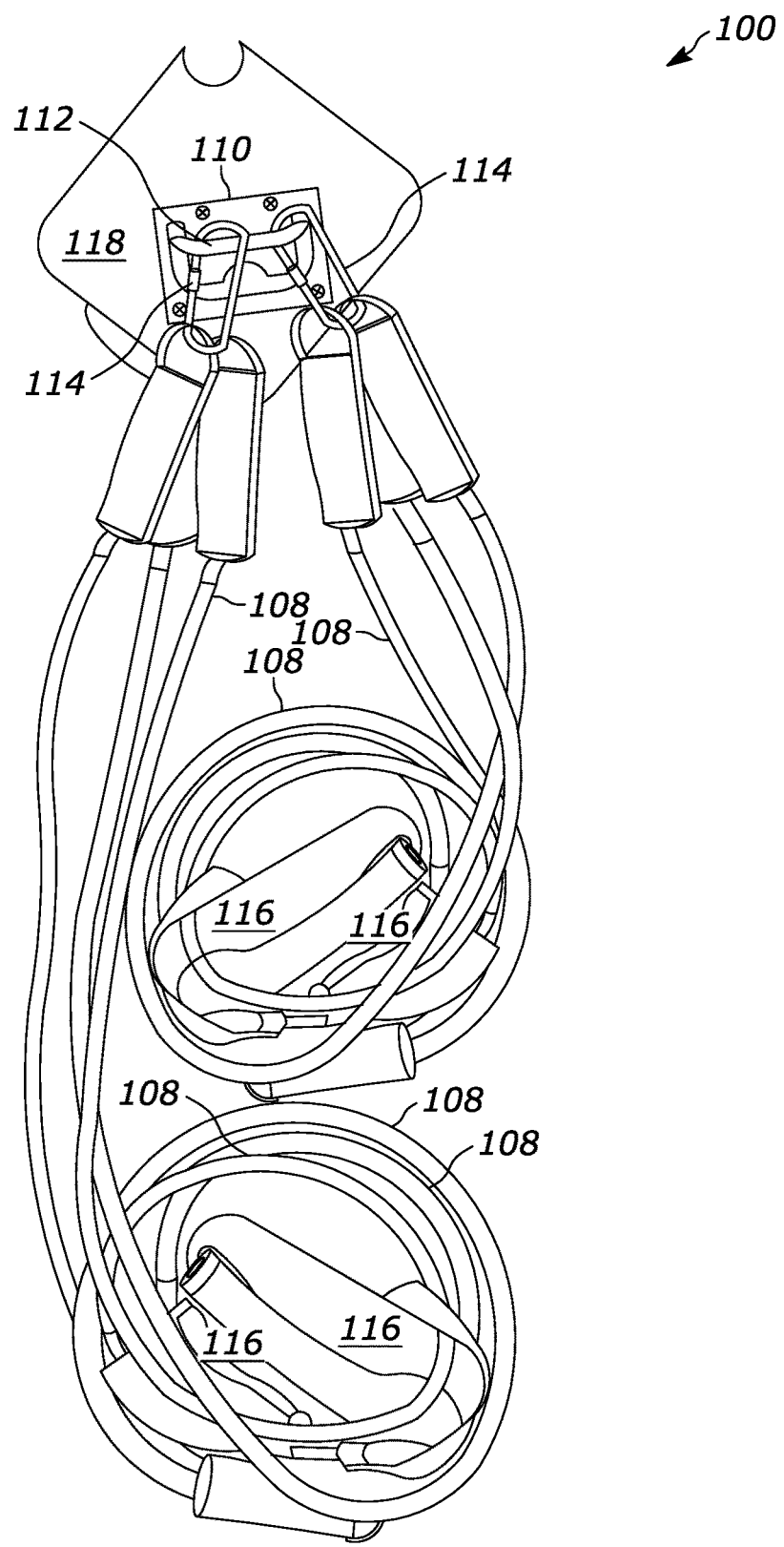
Figure 2C:
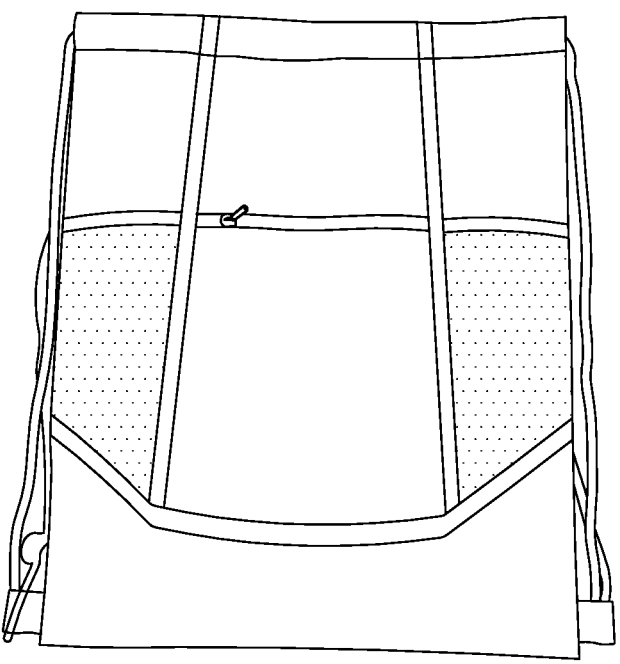
Figure 2D:
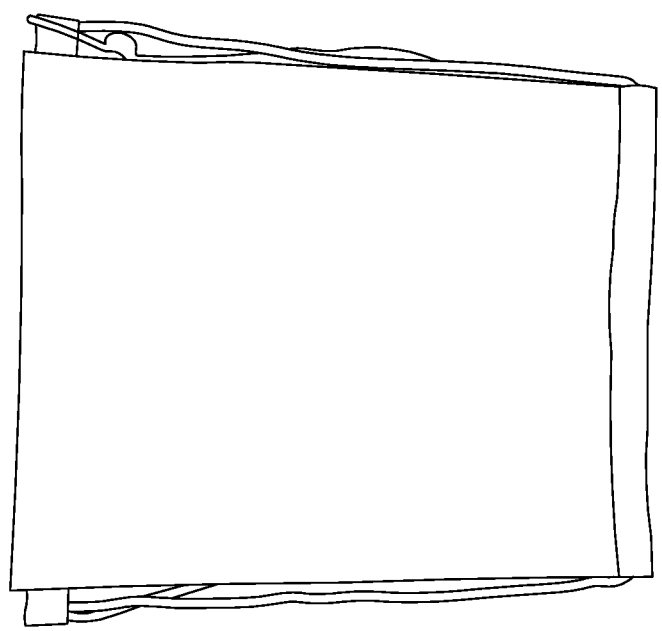

FIGS. 2A to 2D are non-limiting, exemplary illustrations of the apparatus for fitness training shown in FIGS. 1A to 1E in a kit-format in accordance with one or more embodiments of the present invention. FIG. 2A is non-limiting, exemplary illustration that shows the individual components, accessories, and fitness training apparatus 100 separately, while FIG. 2B illustrates the same but assembled, ready for use. Additionally, FIG. 2C illustrates a front side of carrying bag 106 that may be used to carry fitness training apparatus 100, including the various components and accessories illustrated in FIGS. 2A and 2B, while FIG. 2D illustrates a back side of carrying bag 106.

As illustrated in FIGS. 1A to 2D, fitness training apparatus 100 is portable with a compact form-factor that easily fits in carrying bag 106. The portable fitness training apparatus 100 may optionally be used with various other accessories 116 (e.g., ergonomic grips) for a more comfortable and efficient training.

As further illustrated in FIGS. 1A to 2D, the one or more fitness training devices 108 are well-known and may comprise of any one of the one or more combinations of suspension straps, resistance bands, resistance tubes, resistance tubes with protective covering that have an integrated carabiner, combinations thereof, or the like, and etc. The one or more fitness training devices 108 may be connected to an attachment member 112 (e.g., the illustrated D ring) of anchoring plate 110 by a set of detachable members 114 (e.g., the illustrated carabiners).

Figure 3A:
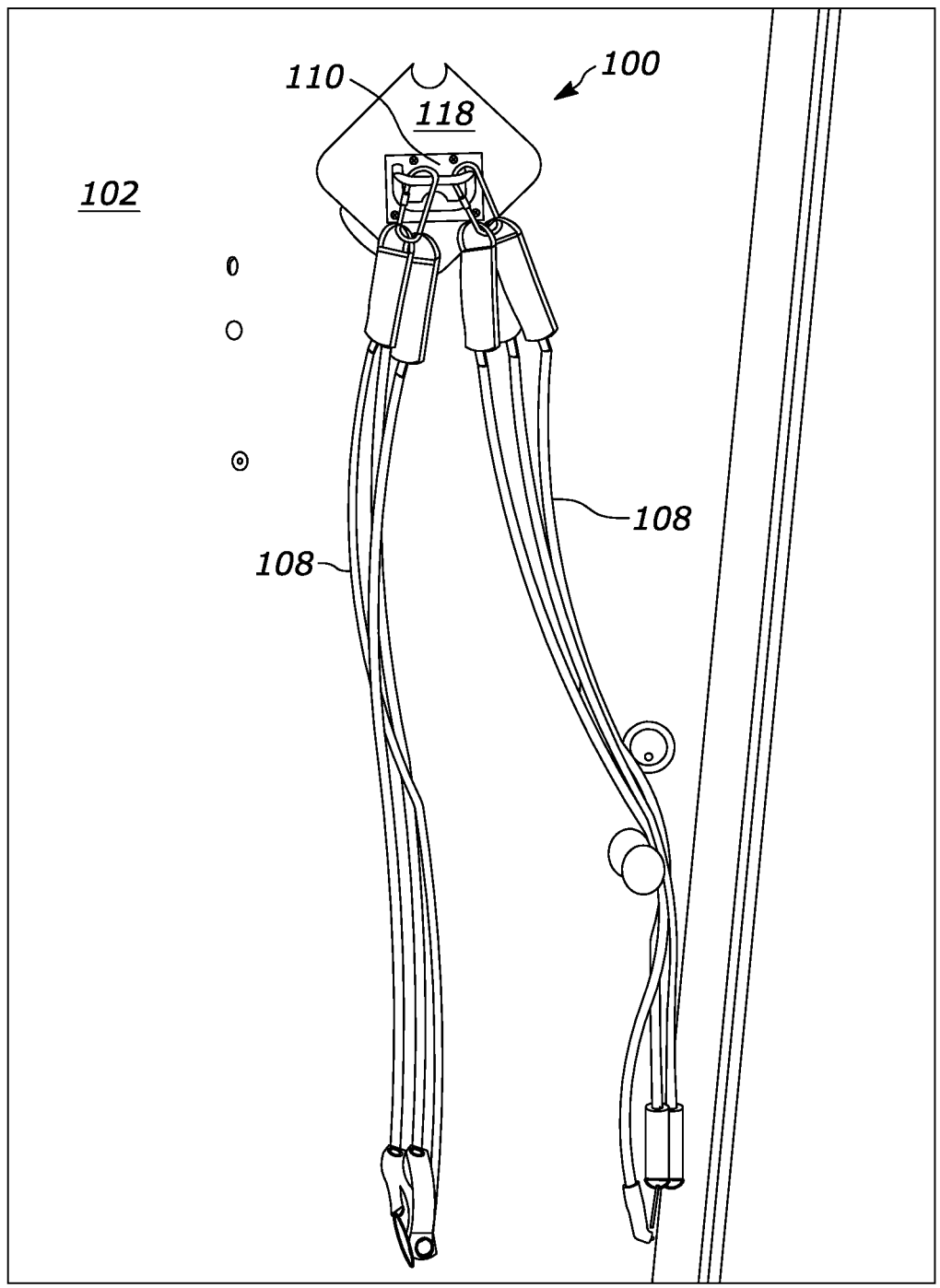
FIGS. 3A to 3H are non-limiting, exemplary close-up illustrations of the apparatus for fitness training as shown in FIGS. 1A to 2D, ready for use but without the user in accordance with one or more embodiments of the present invention.
Figure 3B:
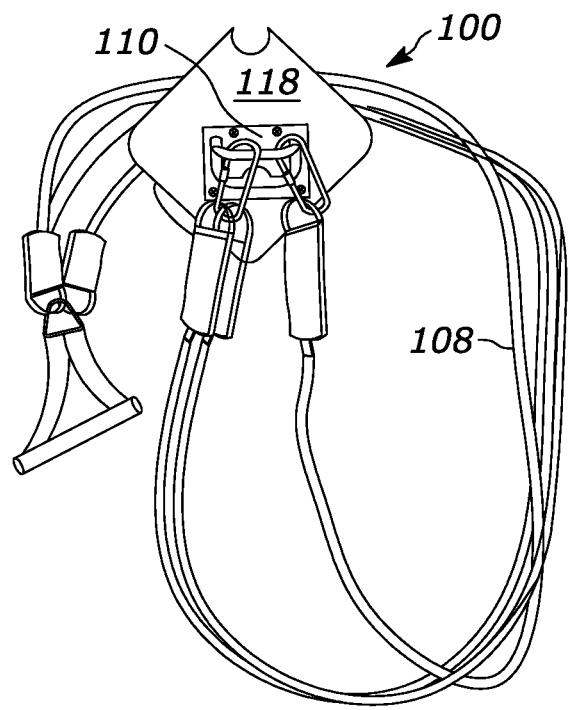
Figure 3C:
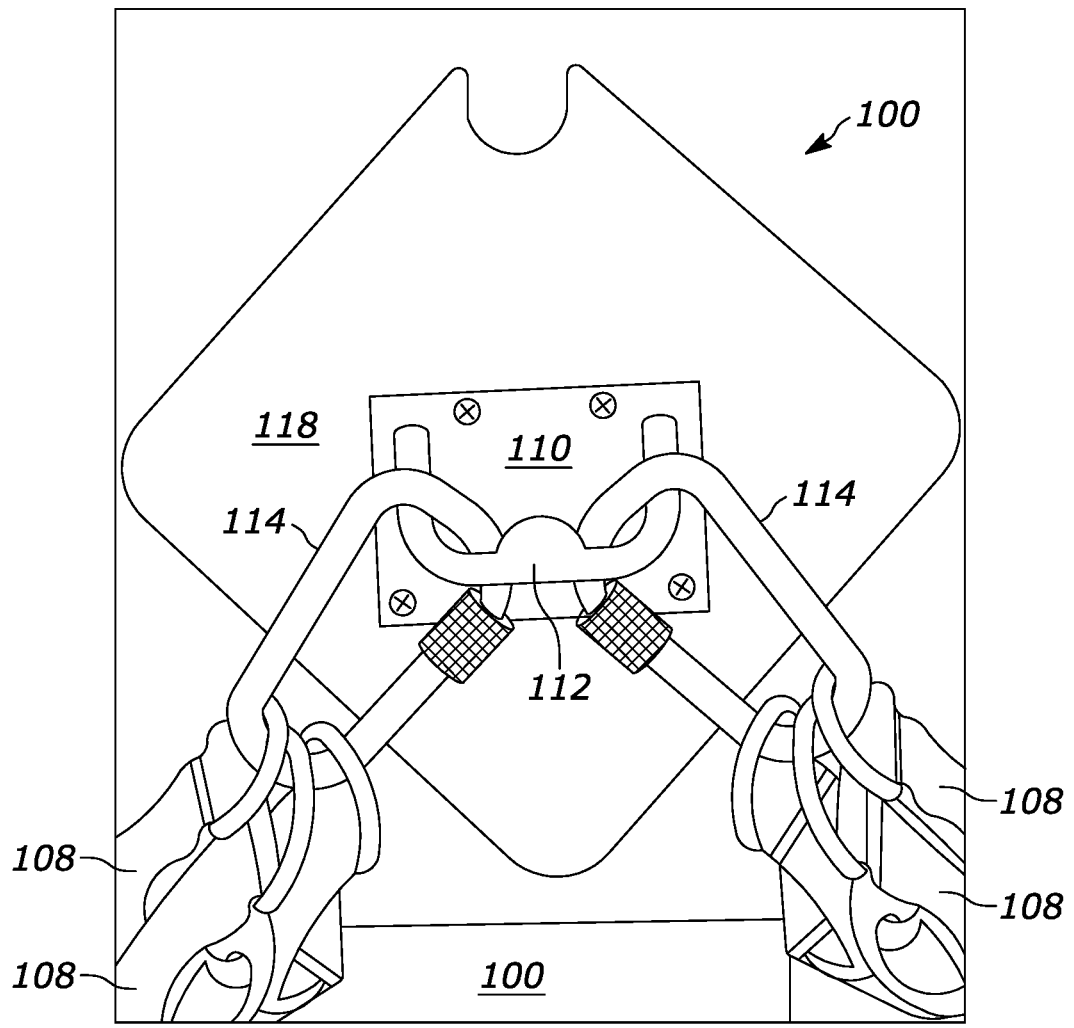
Figure 3D:
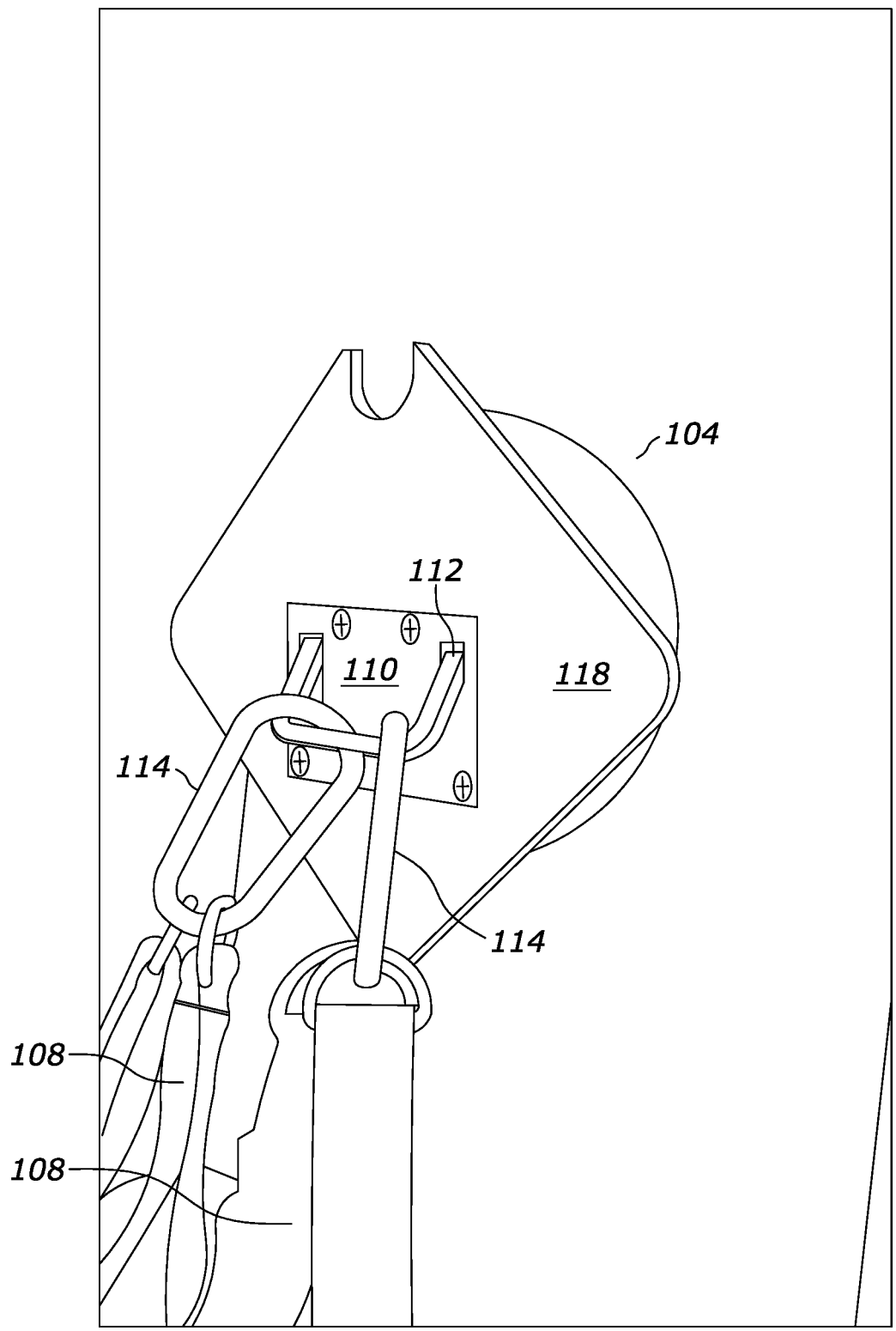
Figure 3E:
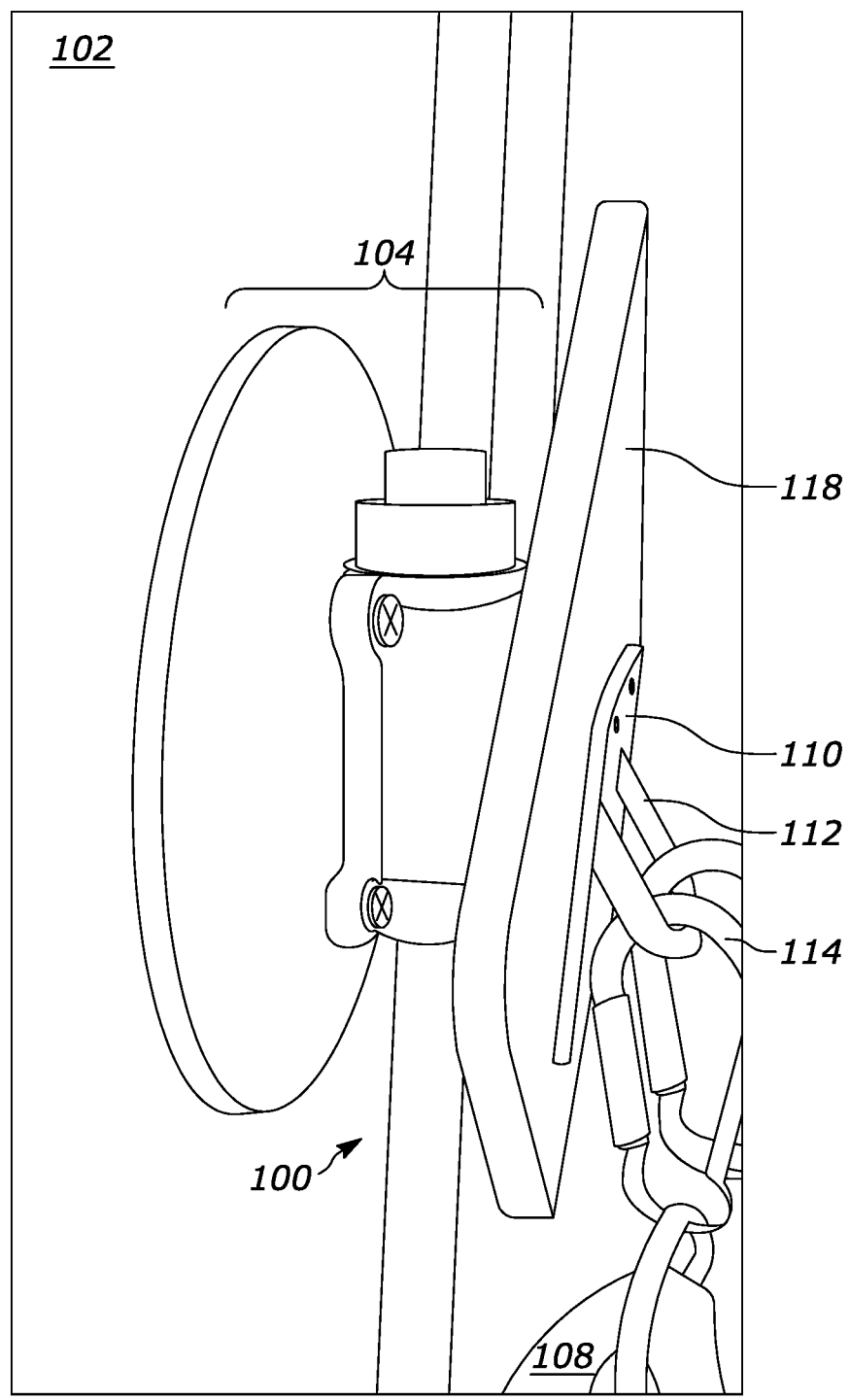
Figure 3F:
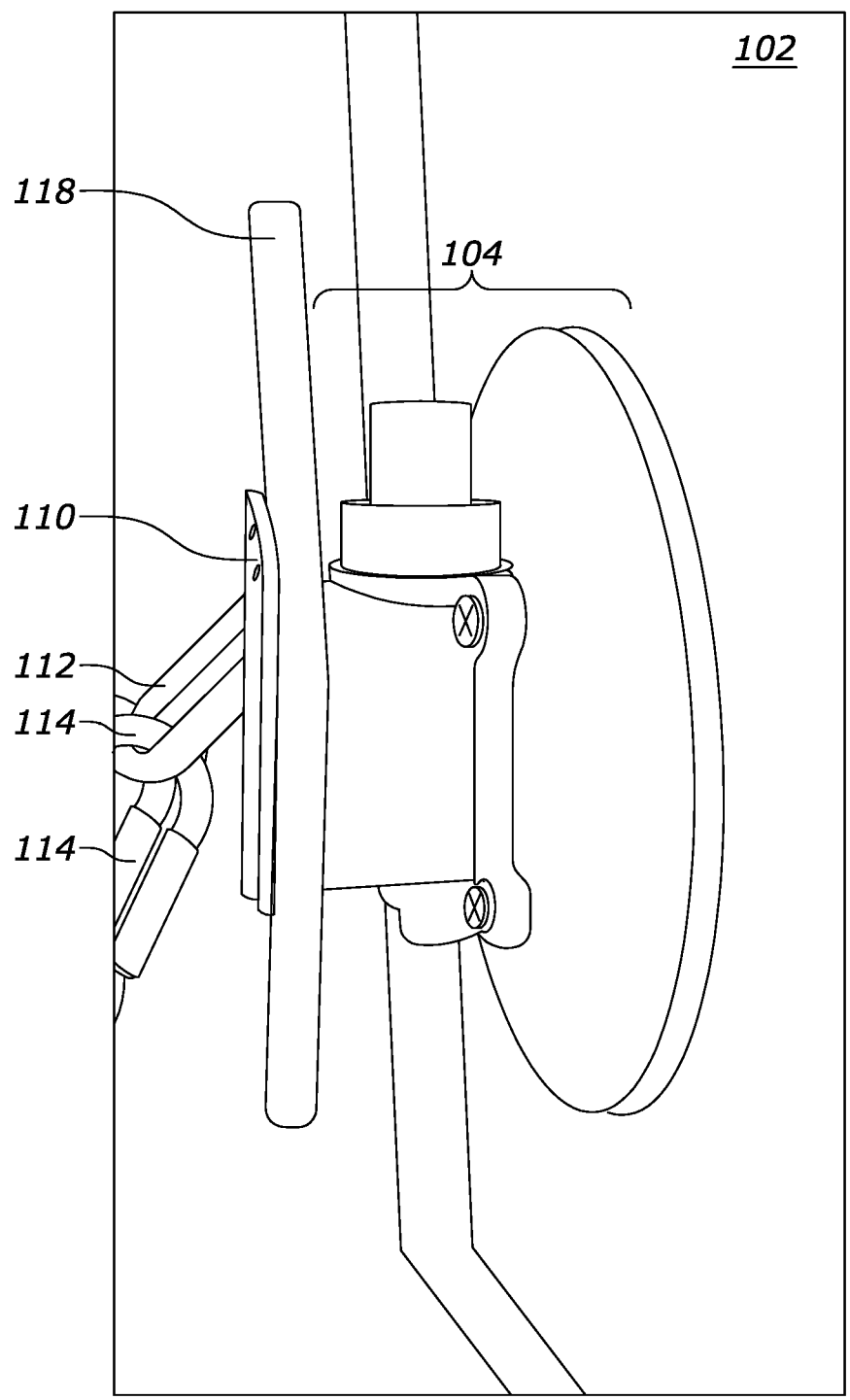
Figure 3G:
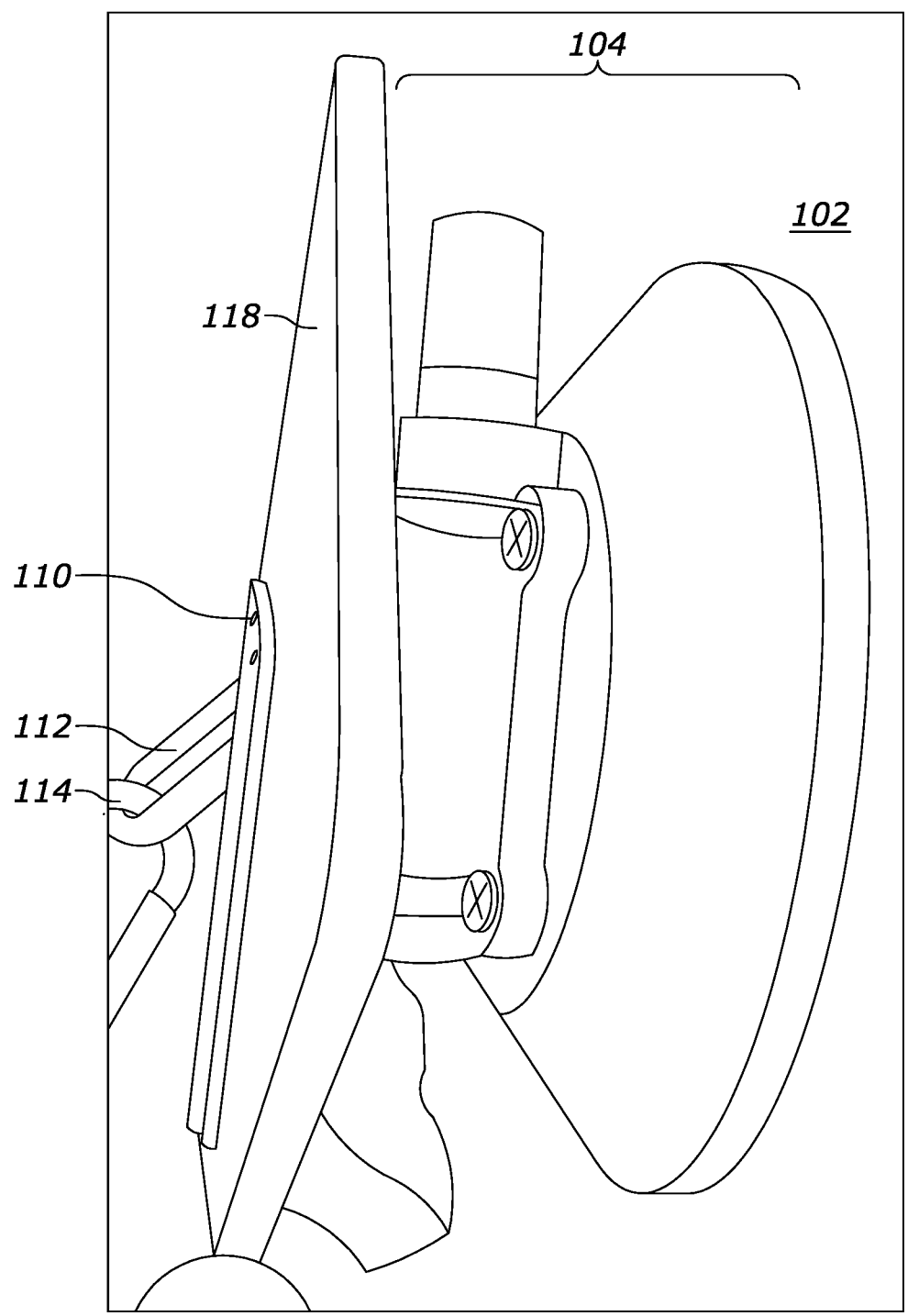
Figure 3H:
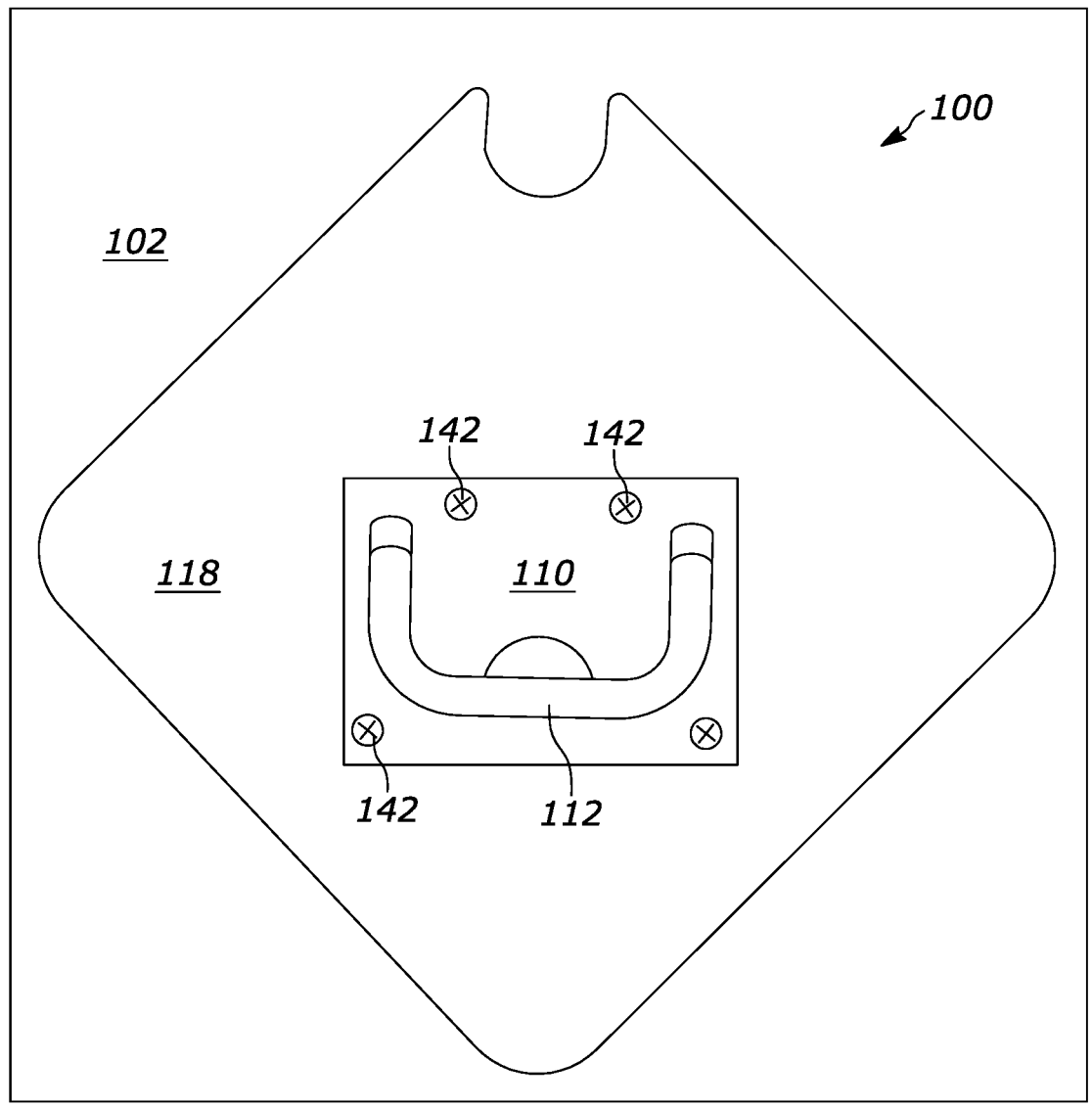

FIGS. 3A to 3H are non-limiting, exemplary close-up illustrations of the apparatus for fitness training as shown in FIGS. 1A to 2D, ready for use but without the user in accordance with one or more embodiments of the present invention. FIG. 3H is non-limiting, exemplary top view illustration of a fully assembled apparatus for fitness training shown in FIGS. 1A to 3G, but with fitness training devices 108 removed in accordance with one or more embodiments of the present invention.

As illustrated in FIGS. 1A to 3H, the portable fitness training apparatus 100 is comprised of an anchoring mechanism 104 for detachably securing apparatus 100 to a flat surface of an anchoring structure 102 (e.g., walls, floors, doors, or the like).

Anchoring mechanism 104 of fitness training apparatus 100 uses the negative fluid pressure of air to detachably attach itself securely to nonporous surface 102. The negative fluid pressure of air is generated by commercial/industrial grade suction cup configured to be secured onto vertical and horizontal flat expand the type of exercises that may be performed, improving the overall fitness training.

The negative fluid pressure strength results in a high load-bearing weight capacity (e.g., 240 lbs.). That is, the amount of force (or load) required to detach the conventional suction cup by simply pulling it is high. This high load-bearing weight capacity or force makes apparatus 100 ideal for intense training and fitness.

In the non-limiting, exemplary instance shown in FIGS. 3A to 3H, portable fitness training apparatus 100 is detachably anchored onto a door 102, with FIG. 3A illustrating the one or more fitness training devices 108 as hanged and FIG. 3B illustrating the one or more fitness training devices 108 wrapped around portable fitness training apparatus 100 while still attached to door 102.

Portable fitness training apparatus 100 is further comprised of an adapter plate 118 connected to anchoring mechanism 104, and an anchoring plate 110 connected to anchoring mechanism 104 using adapter plate 118.

One or more fitness training devices 108 may be connected to anchoring plate 110 for training. The one or more fitness training devices 108 may be comprised of any one of the one or more combinations of suspension straps, resistance bands, resistance tubes, combinations thereof, or the like. The one or more fitness training devices 108 may be connected to an attachment member 112 (e.g., the illustrated D ring) of anchoring plate 110 by a set of detachable members 114 (e.g., the illustrated carabiners).

Figure 4A:
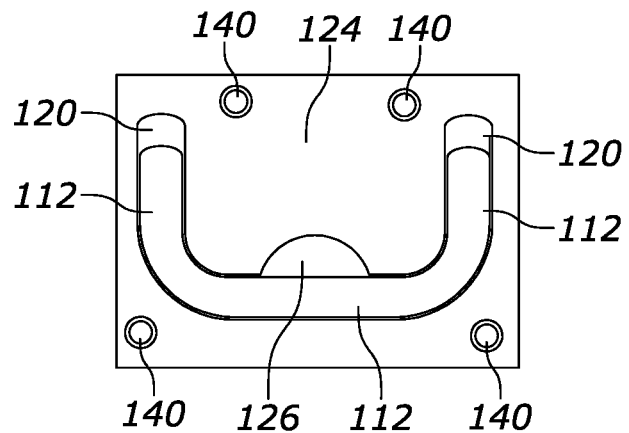
FIGS. 4A and 4B are non-limiting, exemplary illustrations of an anchoring plate of the apparatus for fitness training shown in FIGS. 1A to 3H in accordance with one or more embodiments of the present invention.
Figure 4B:
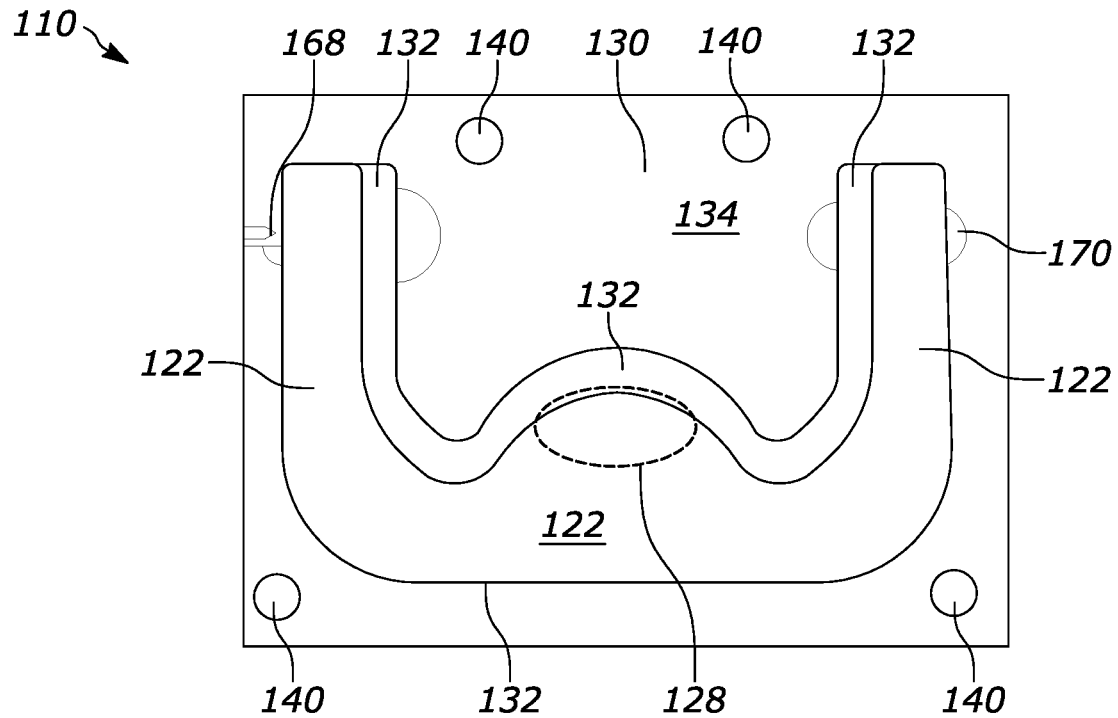

FIGS. 4A and 4B are non-limiting, exemplary illustrations of an anchoring plate of the apparatus for fitness training shown in FIGS. 1A to 3H in accordance with one or more embodiments of the present invention. As illustrated and further detailed below, anchoring plate 110 may comprise of a marine grade, stainless steel D ring plate, which is comprised of a recessed surface 120. Recessed surface 120 may further comprise a relief 126 portion for accessing the recessed attachment member 112 using a finger.

Further included within anchoring plate 110 is a recessed attachment member (e.g., D handle) 112 within recessed surface 120 that enables attachment member 112 to be flush with a top surface side 124 of anchoring plate 110. Attachment member 112 (the illustrated D ring) may be moveably associated with adapter plate 110 via a hinge mechanism (not shown) in a well-known manner.

A topography of a back side 130 (FIG. 4B) is comprised of an offset surface 122 (e.g., protrusion or bulging) define by raised edges 132 from back side surface 134, resulting in protruded (or bulging) section 122. Protrusion 122 is a result of recessed surface 120 at top side 124 of anchor plate 110. The portion 128 of protrusion 122 indicated by dashed line ellipse corresponds to relief 126 portion at top side 124.

A critical and advantageous reason for raised edge 132 of protrusion 122 is that it interlocks with corresponding edges 136 (FIG. 5A) of interlocking cutout (or relief or recess) 138 on adapter plate 118 to thereby prevent in-plane rotation and out of plane movement (wobbling) of anchoring plate 110.

As further illustrated, back side 130 of adapter plate 110 may further include lateral protuberances 168 and 170, which are reliefs or cavities on top side 124 of adapter plate 110 to accommodate a hinge mechanism of attachment member 112. Lateral protuberances 168 and 170 are accommodated within lateral reliefs 172 and 174 of adapter plate 118.

As further illustrated, also included is a set of fastener openings 140 for receiving PEM® type fasteners 142 or the like. In this non-limiting, exemplary instance, the fastener openings 140 (at top surface side 124) are comprised of countersink holes to enable fasteners heads of fasteners 142 to be flush with top surface side 124 when anchor plate 110 is fully assembled onto adapter plate 118.

Figures 1, 5A:
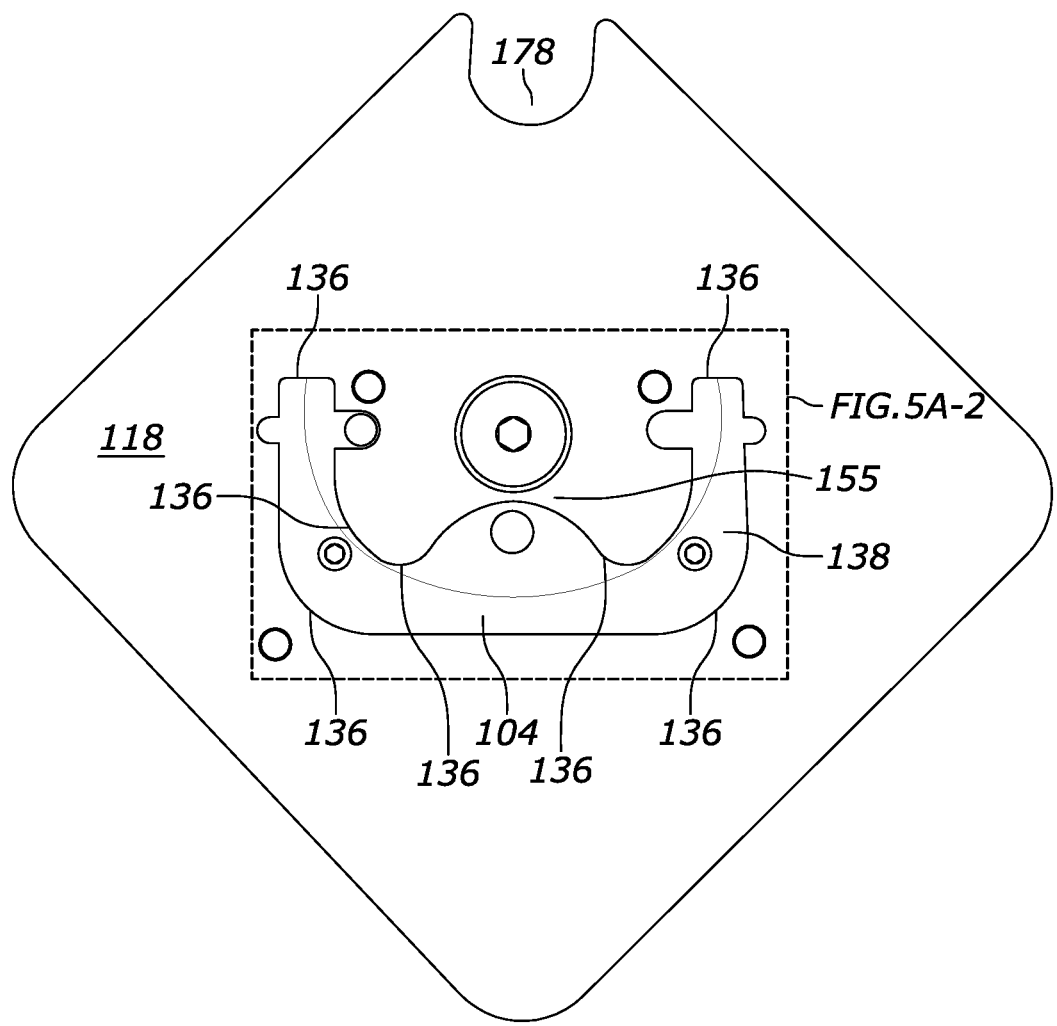
FIGS. 5A-1 to 5G are non-limiting, exemplary illustrations of an adapter plate of the apparatus for fitness training shown in FIGS. 1A to 4B in accordance with one or more embodiments of the present invention.
Figures 2, 5A:
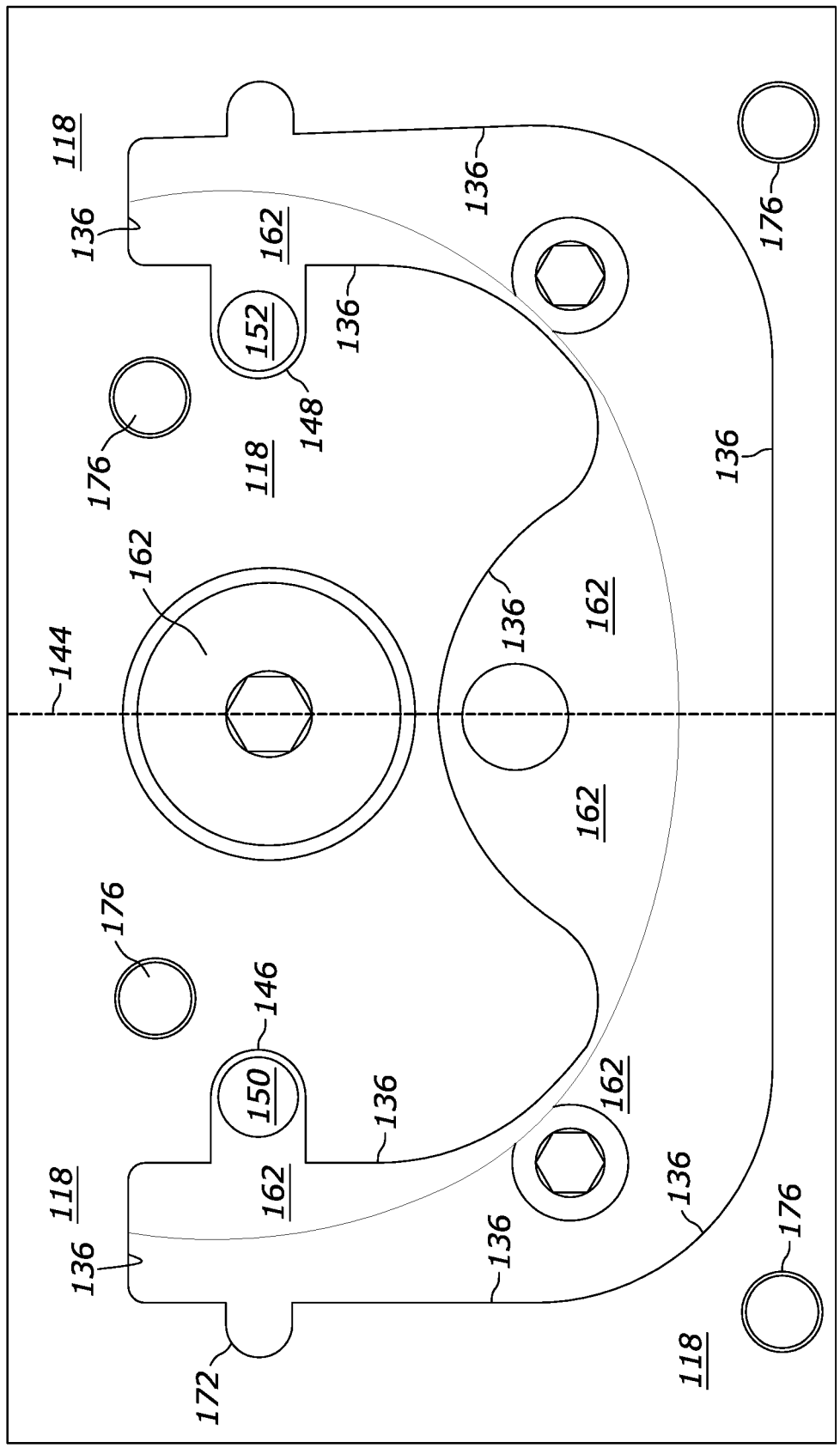
Figure 5B:
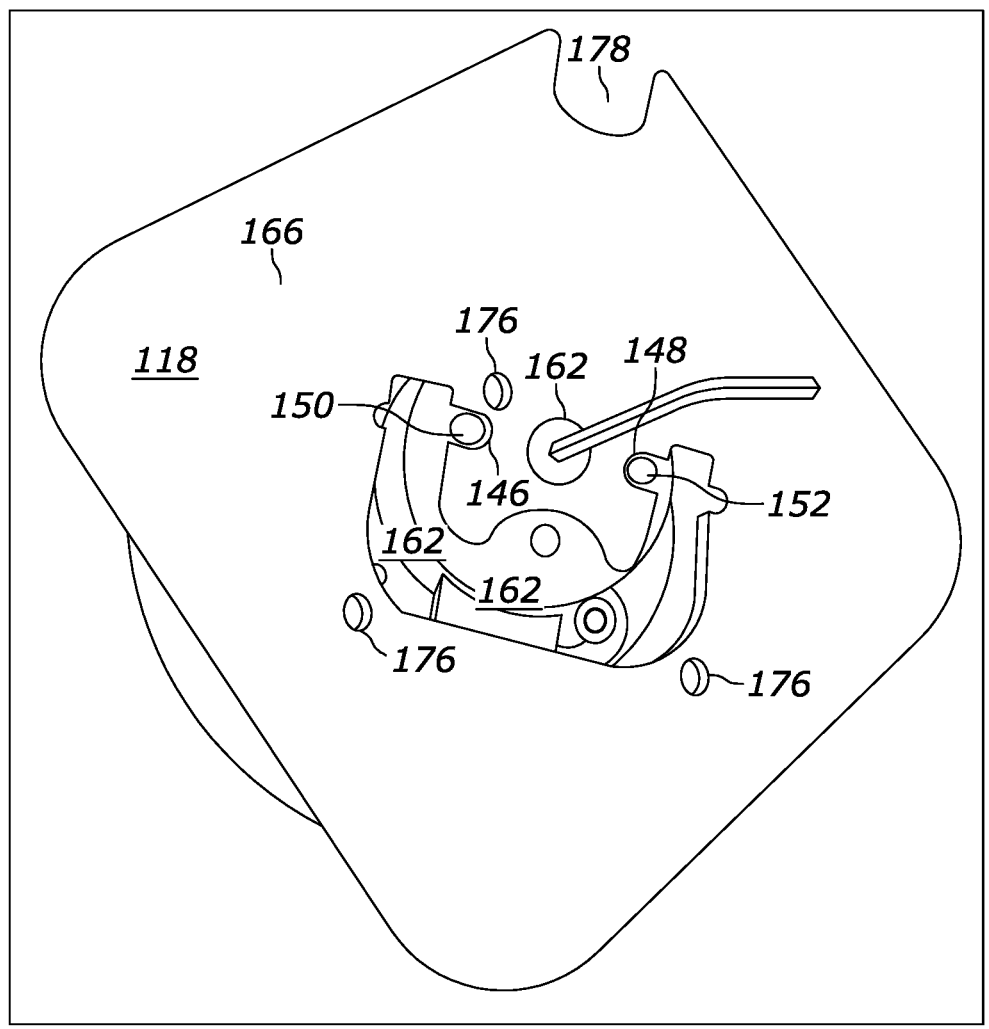
Figure 5C:
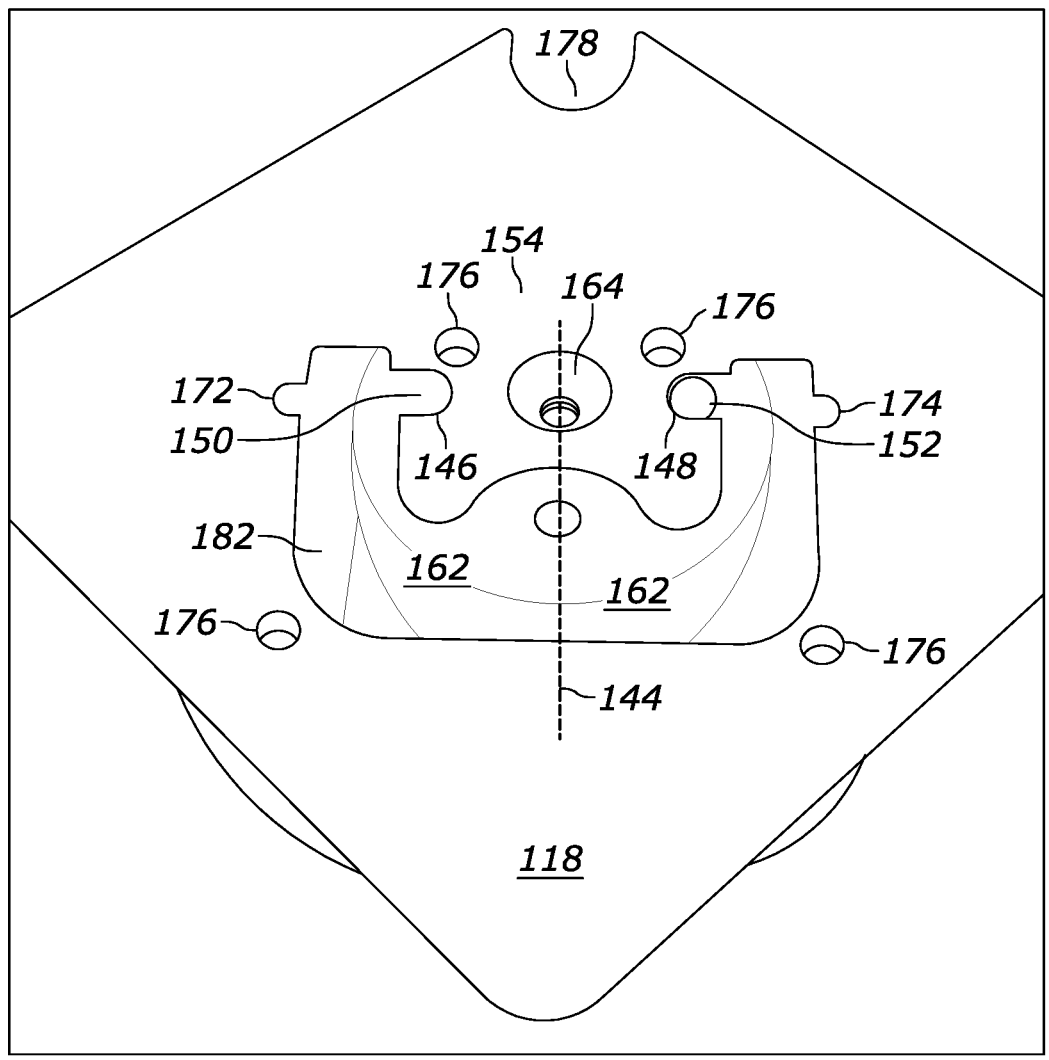
Figure 5D:
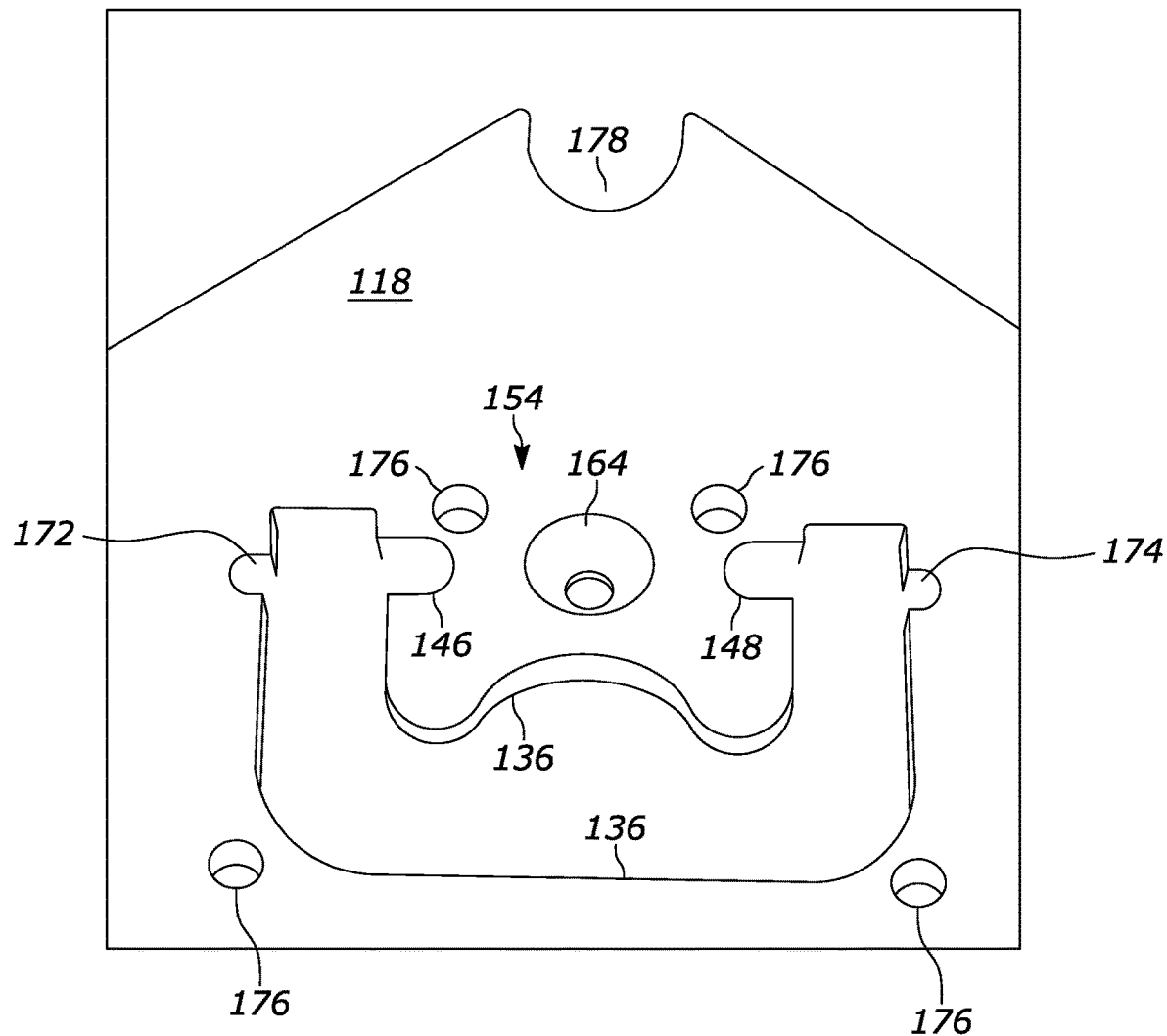
Figure 5E:
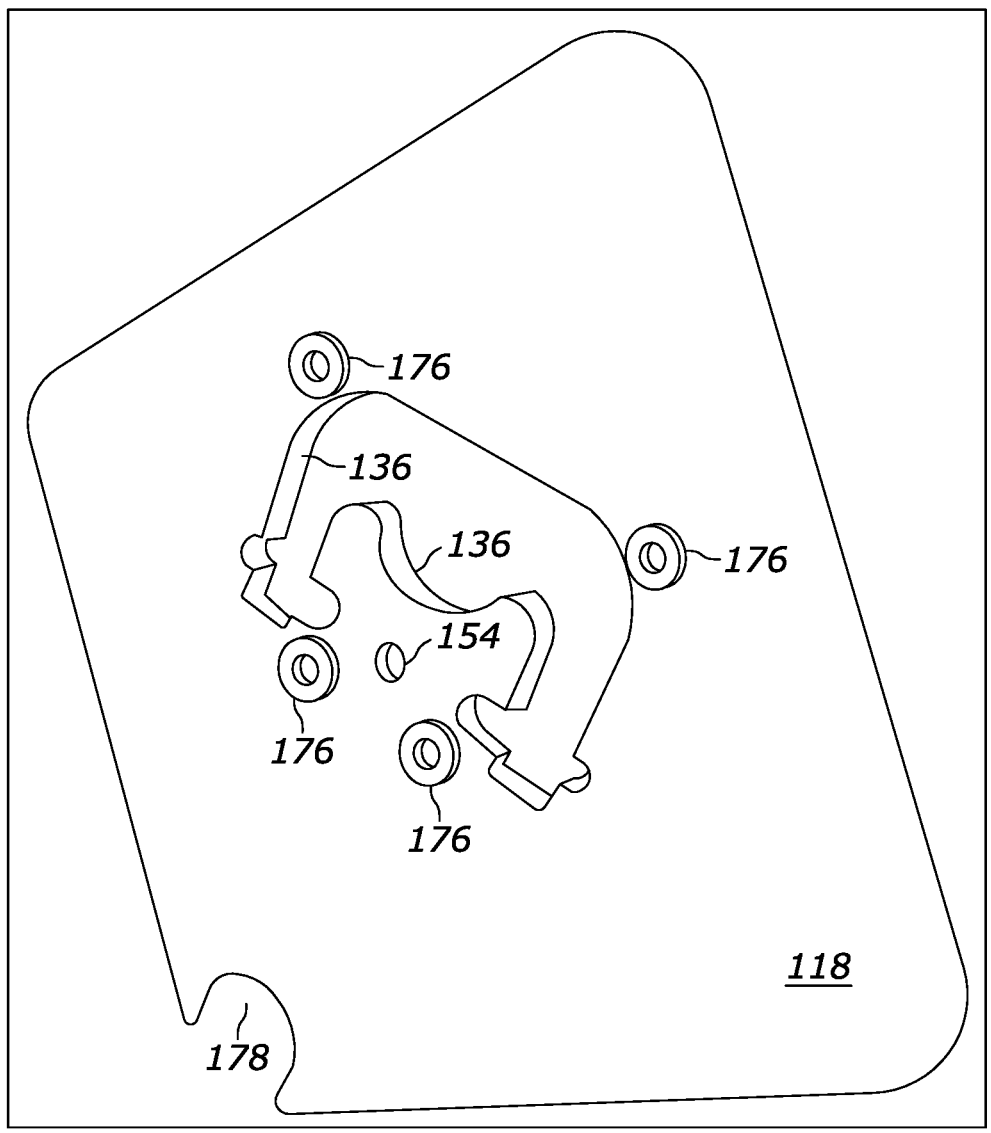
Figure 5F:
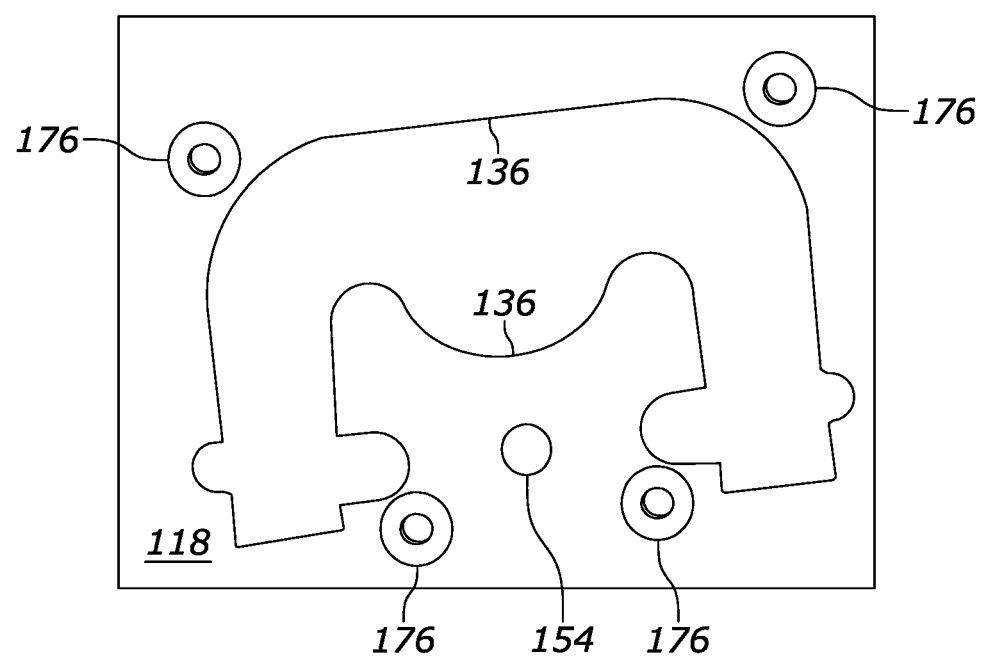
Figure 5G:
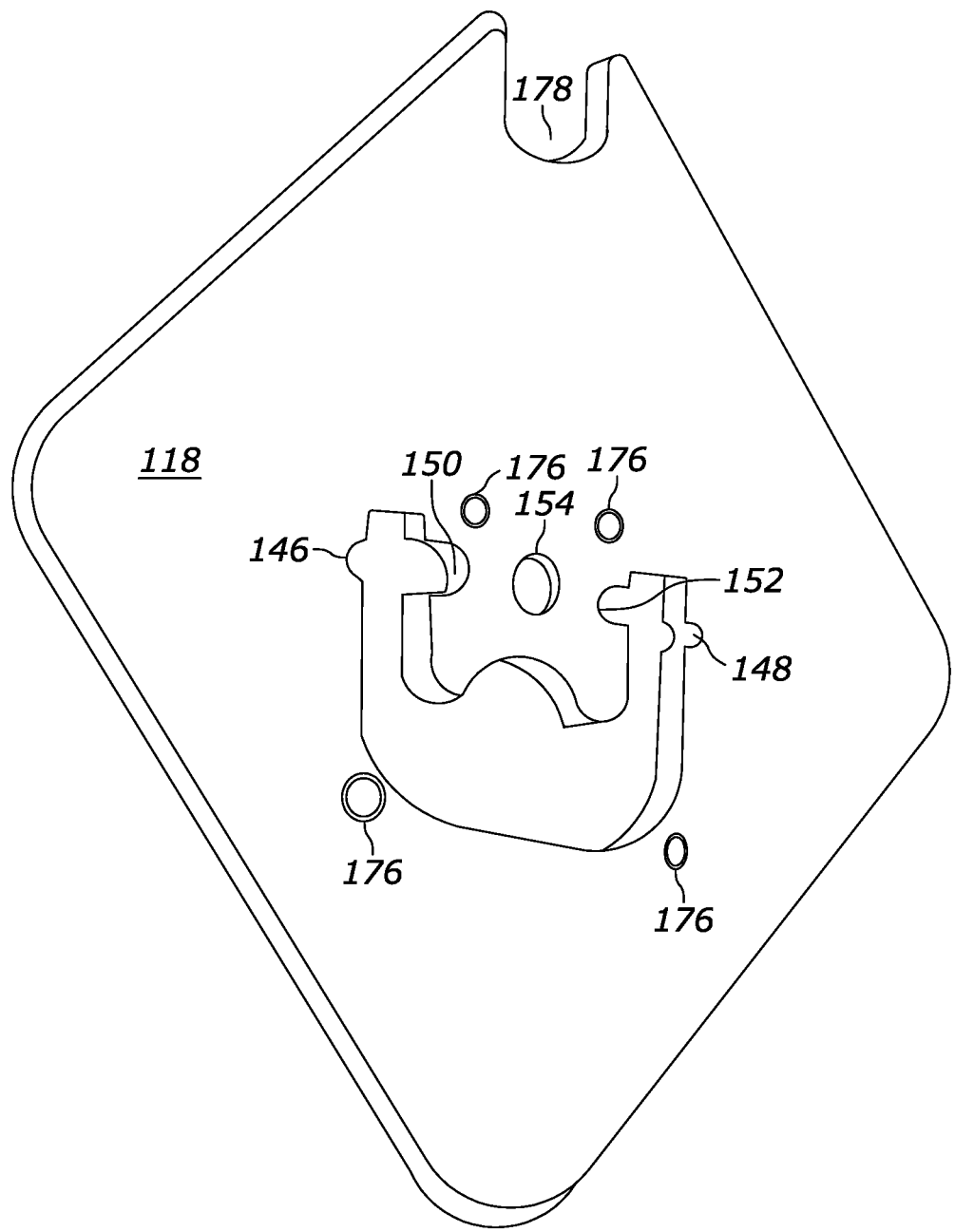

FIGS. 5A-1 to 5G are non-limiting, exemplary illustrations of an adapter plate of the apparatus for fitness training shown in FIGS. 1A to 4B in accordance with one or more embodiments of the present invention.

As illustrated, adapter plate 118 is comprised of a cutout 138 with symmetrical lateral sections (as shown by line of symmetry 144) configured to receive and securely mount anchoring plate 110 onto adapter plate 118.

Cutout 138 includes a first interlocking recess 146 and a second interlocking recess 148 that receive corresponding a first interlocking projection 150 and a second interlocking projection 152 of anchoring mechanism 104.

The interlocking projections 150 and 152 have cylindrical configuration that interlock with interlocking recessed sections 146 and 148, prevent adapter plate 118 from in-plane rotation and out-of-plane movement (wobbling).

Cutout 138 has a generally U-configured periphery edge 136 that receives the generally commensurately configured protrusion 122 of back side 130 of anchoring plate 110 (shown in FIG. 4B). U-configured cutout section 138 includes a recessed relief portion 155 that receives bulging section 128 of anchoring plate 110, which is the finger relief 126 of anchoring plate 110. Accordingly, raised edges 132 of protrusion 122 of back side 130 of anchoring plate 110 abut against corresponding periphery edges 136 of cutout 138 of adapter plate 118.

U-configured cutout section 138 and commensurately configured protrusion 122 at back side 130 of anchoring plate 110 interlock, which further facilitates in preventing in-plane and out of plane motion of adapter plate 118 and anchoring plate 110. As indicated above, lateral reliefs 172 and 174 of adapter plate 118 accommodate lateral protuberances 168 and 170 of back side 130 of adapter plate 110.

Adapter plate 118 further includes a main fastener opening 154 that when aligned with an opening 156 on a top 158 of housing 162 of a pneumatic vacuum pump 160, enables secure mounting of adapter plate 118 using an adapter plate fastener 162.

Main fastener opening 154 is a countersink hole with a beveled radial surface 164 forming a conical hole to allow for a head of adapter plate fastener 162 (a countersink screw) to be flush with a top surface 166 of adapter plate 118.

Also included are four threaded fasteners opening 176 that enables securing of anchor plate 110 onto adapter plate 118 using PEM® type fasteners; or the like. When assembled, fastener openings 140 of anchor plate 110 align with fastener openings 176 of adapter plate 118, with fasteners threaded through both sets of openings 140 and 176 to secure anchor plate 110 onto adapter plate 118. An outer edge recessed cutout (or relief) 178 is provided on adapter plate 118 for accessing pneumatic vacuum pump 162 of the suction cup (detailed below).

Figure 6A:
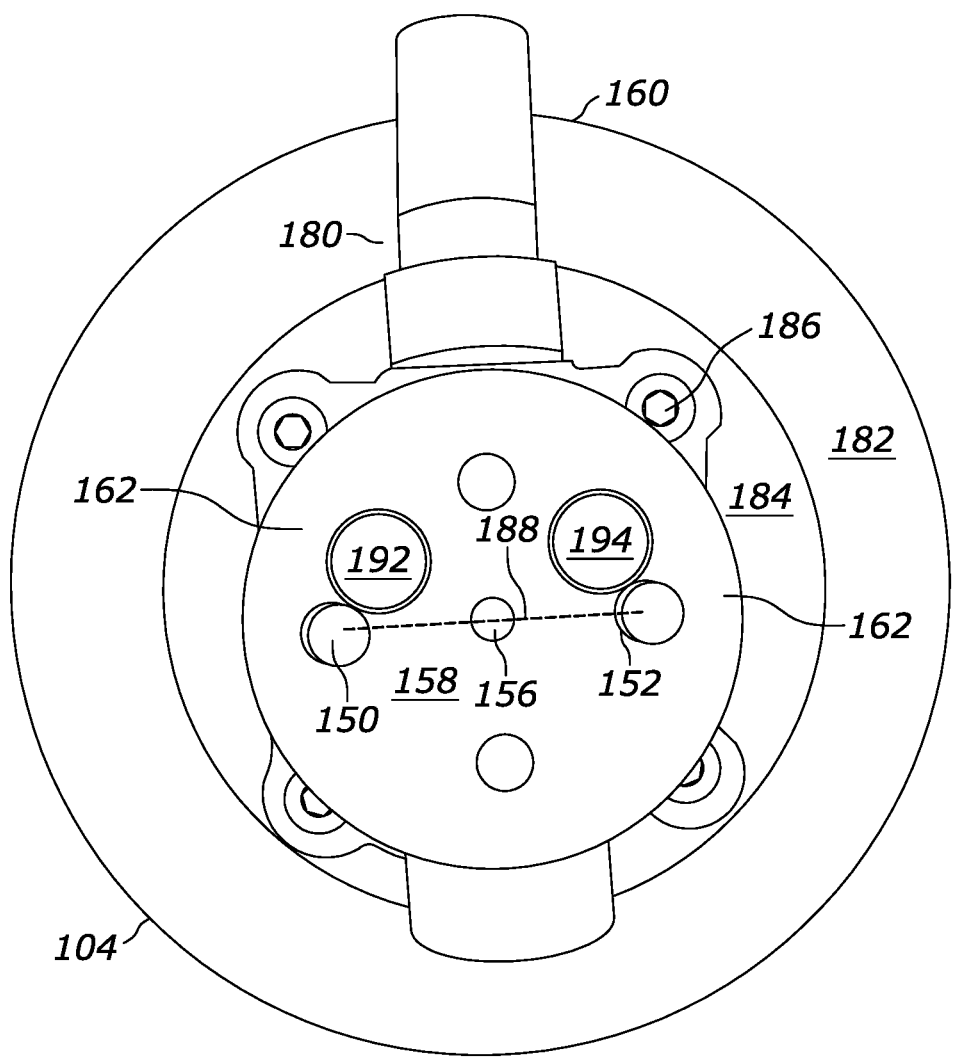
FIGS. 6A to 6C are non-limiting, exemplary illustrations of an anchoring mechanism of the apparatus for fitness training shown in FIGS. 1A to 5G in accordance with one or more embodiments of the present invention.
Figure 6B:
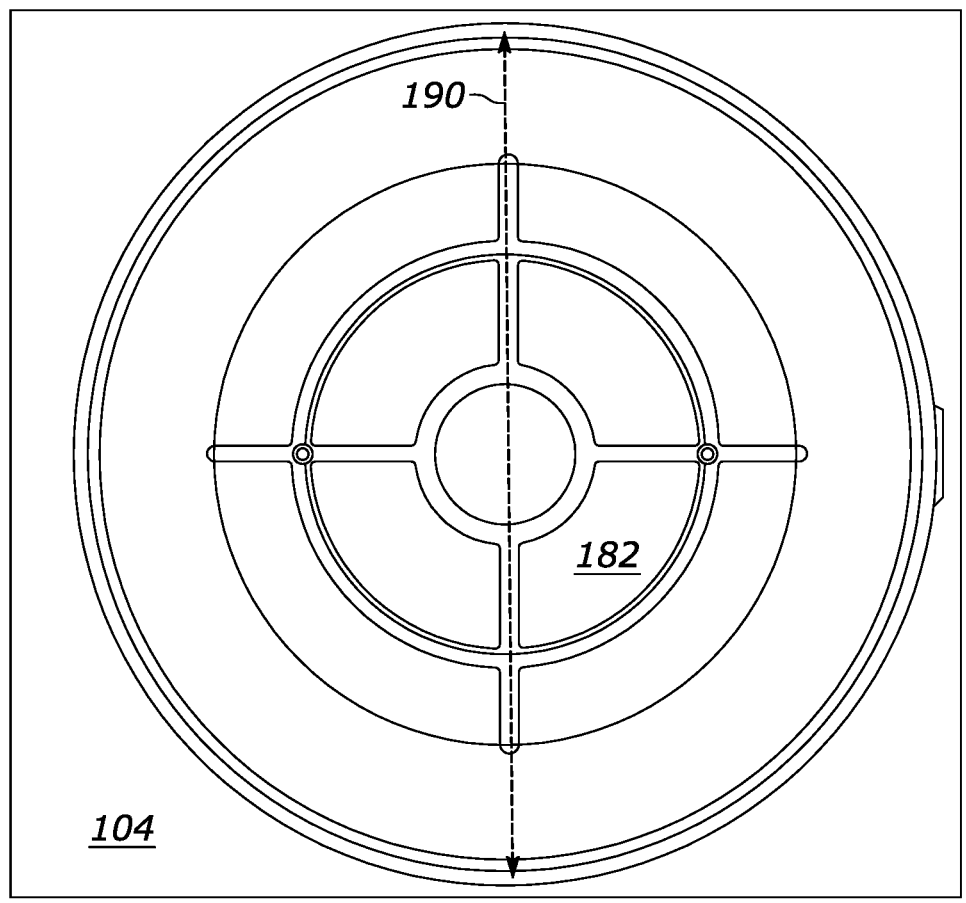
Figure 6C:
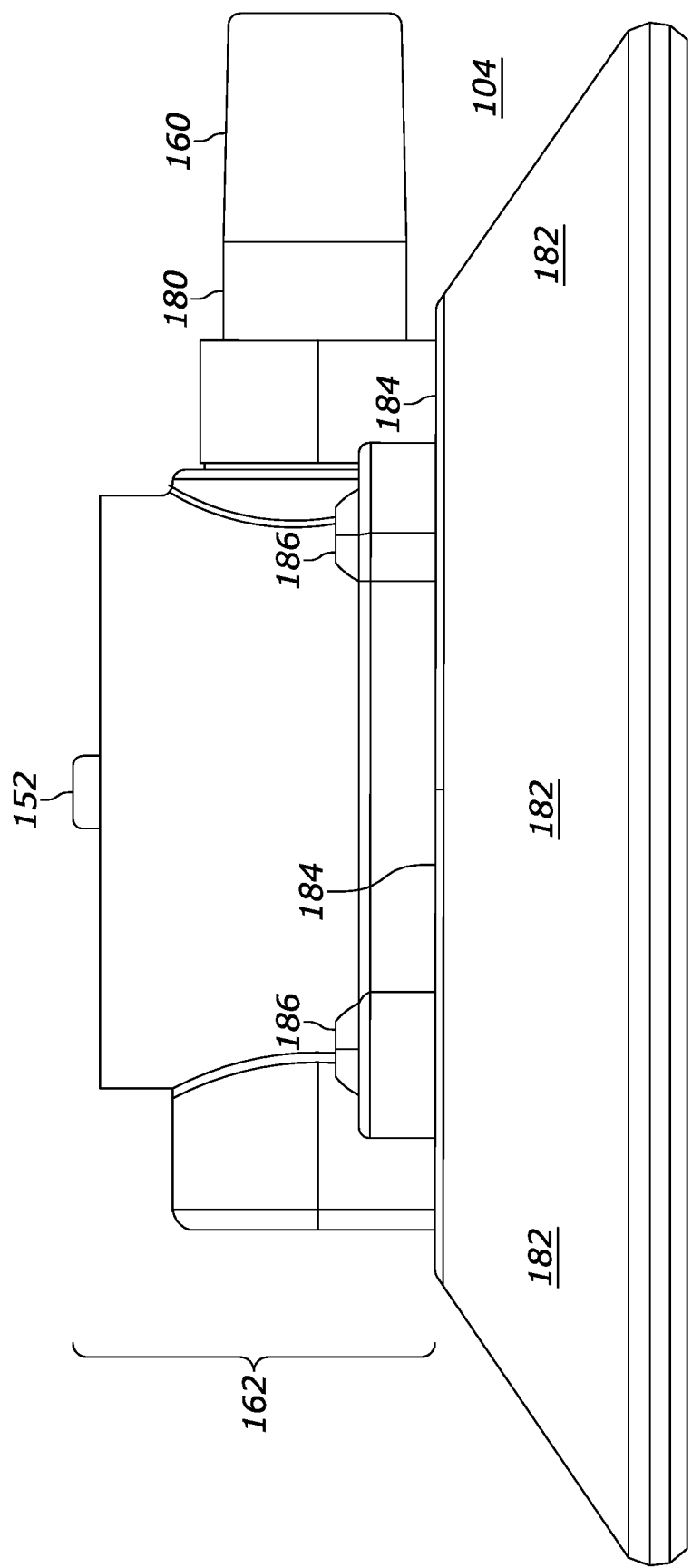

FIGS. 6A to 6C are non-limiting, exemplary illustrations of an anchoring mechanism of the apparatus for fitness training shown in FIGS. 1A to 5G in accordance with one or more embodiments of the present invention.

As illustrated, anchoring mechanism 104 is comprised of a commercial grade heavy duty suction cup 182 with a cross-sectional width 190 of about 6 inches with a load-bearing weight capacity of 250 lbs. Anchoring mechanism 104 has a pneumatic vacuum pump 160 that includes vacuum status indicator 180. Pneumatic vacuum pump 160 is secured within housing 162 on top 184 of suction cup 182 by a set of fasteners 186.

Housing 162 includes an opening 156 on a top surface 158 that when aligned with a main opening 154 of adapter plate 118, receives fastener 162 for securely mounting adapter plate 118 onto housing 162 of anchor mechanism 104.

Further included are a first interlocking projection 150 that is aligned with a second interlocking projection 152, with opening 156 aligned with and in between first interlocking projection 150 and second interlocking projection 152 as shown by dashed alignment line 188.

First interlocking projection 150 and second interlocking projection 152 interlock with a corresponding first interlocking recess 146 and a second interlocking recess 148 of adapter plate 118 to prevent in-plane motion of adapter plate 118. In other words, the center of first and second interlocking projections 150 and 152 and opening 156 are aligned and in series. This is critical as first and second interlocking projections 150 and 152 positioned equally distanced and at lateral sides of opening 156 are used to prevent in-plane motion of adapter plate 118.

Further provided are a first and a second recessed surfaces (e.g., cavities) 192 and 194 on top 158 of housing 162 that function as reliefs for receiving distal ends of top two fasteners 142 of anchor plate 110 for securing anchoring plate 110 onto adapter plate 118.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An apparatus for fitness training, comprising:
   an anchoring mechanism for detachably securing the apparatus to a flat surface of a structure;
   an adapter plate connected to the anchoring mechanism; and
   an anchoring plate connected to the anchoring mechanism using the adapter plate.

2. The apparatus for fitness training as set forth in claim 1, wherein:
   one or more fitness training devices are connected to the anchoring plate.

3. The apparatus for fitness training as set forth in claim 2, wherein:
   the one or more fitness training devices are comprised of any one of suspension straps, resistance bands, resistance tubes, or combinations thereof.

4. The apparatus for fitness training as set forth in claim 3, wherein:
   the one or more fitness training devices are connected to an attachment member of the anchoring plate by a set of detachable members.

5. The apparatus for fitness training as set forth in claim 1, wherein:
   the adapter plate comprises:
   a cutout comprising a section that receives a generally commensurately configured protrusion of a back side of the anchoring plate to securely mount the anchoring plate onto the adapter plate.

6. The apparatus for fitness training as set forth in claim 5, wherein:
   the cutout includes:
   a first interlocking recess and a second interlocking recess that receive corresponding a first interlocking projection and a second interlocking projection of the anchoring mechanism.

7. The apparatus for fitness training as set forth in claim 6, wherein:
   an interlocking of the interlocking projections with the interlocking recesses, prevents the adapter plate from in-plane rotation and out-of-plane movement.

8. The apparatus for fitness training as set forth in claim 5, wherein:
   the cutout has symmetrical lateral sections.

9. The apparatus for fitness training as set forth in claim 5, wherein:
   the section of the cutout comprises:
   a generally U-shaped configuration.

10. The apparatus for fitness training as set forth in claim 5, wherein:
    the section of the cutout includes a recessed relief portion that receives a bulging finger relief of the anchoring plate.

11. The apparatus for fitness training as set forth in claim 5, wherein:
    the section of the cutout and commensurately configured protrusion of the back side of the anchoring plate interlock to facilitate preventing in-plane and out of plane motion of the adapter plate.

12. The apparatus for fitness training as set forth in claim 1, wherein:
    a first interlocking projection and a second interlocking projection of the anchoring mechanism interlock with a corresponding first interlocking recess and a second interlocking recess of the adapter plate to prevent in-plane motion of the adapter plate.

13. The apparatus for fitness training as set forth in claim 12, wherein:
    a center of the first and second interlocking projections and an opening of the anchoring mechanism are aligned and in series.

14. The apparatus for fitness training as set forth in claim 1, wherein:
    the anchoring mechanism comprises:
    an opening on a top of a housing that when aligned with a main opening of the adapter plate receives a fastener for securely mounting the adapter plate.

15. The apparatus for fitness training as set forth in claim 1, wherein:
    the anchoring mechanism comprises:
    a first recessed surface and a second recessed surfaces on a top of a housing that function as reliefs for receiving distal ends of fasteners for securing the anchoring plate onto the adapter plate.

16. The apparatus for fitness training as set forth in claim 1, wherein:
    the adapter plate further includes:
    a main fastener opening that when aligned with an opening on a top of a pneumatic vacuum pump housing of the anchoring mechanism enables securely mounting the adapter plate using an adapter plate fastener;

the main fastener opening is a countersink hole with a beveled radial surface forming a conical hole to allow for a head of the adapter plate fastener to be flush with a top surface of the adapter plate.

17. The apparatus for fitness training as set forth in claim 1, wherein:
the adapter plate further includes:
an outer edge recess that functions as a relief for accessing a pneumatic vacuum pump of a suction cup of the anchoring mechanism.

18. The apparatus for fitness training as set forth in claim 1, wherein:
the anchoring plate is comprised of:
a recessed surface that forms a back side protrusion;
an attachment member that rests within the recessed surface to enable the attachment member to be flush with a top surface of the anchoring plate.

19. The apparatus for fitness training as set forth in claim 1, wherein:
the anchoring plate is comprised of:
a relief for accessing an attachment member that is at rest within a recessed surface.

20. The apparatus for fitness training as set forth in claim 19, wherein:
the relief is a cavity that forms a protuberance on a bottom side of the anchoring plate that interlocks with a corresponding interlocking recess on the adapter plate to thereby prevent the anchoring plate from in-plane rotation and out of plane movement.

21. The apparatus for fitness training as set forth in claim 1, wherein:
the anchoring plate is comprised of:
a set of fastener openings for securing the anchoring plate onto the adapter plate.

* * * * *